(12) United States Patent
Kondo et al.

(10) Patent No.: US 9,455,641 B2
(45) Date of Patent: Sep. 27, 2016

(54) DC/DC CONVERTER

(71) Applicants: Ryota Kondo, Tokyo (JP); Masaki Yamada, Tokyo (JP); Yusuke Higaki, Tokyo (JP)

(72) Inventors: Ryota Kondo, Tokyo (JP); Masaki Yamada, Tokyo (JP); Yusuke Higaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 236 days.

(21) Appl. No.: 14/364,186

(22) PCT Filed: Dec. 13, 2012

(86) PCT No.: PCT/JP2012/082299
§ 371 (c)(1),
(2) Date: Jun. 10, 2014

(87) PCT Pub. No.: WO2013/121665
PCT Pub. Date: Aug. 22, 2013

(65) Prior Publication Data
US 2015/0015181 A1 Jan. 15, 2015

(30) Foreign Application Priority Data

Feb. 14, 2012 (JP) .................................. 2012-029001
Oct. 9, 2012 (JP) .................................. 2012-223837

(51) Int. Cl.
*H02J 7/00* (2006.01)
*H02M 3/335* (2006.01)
*H02M 1/00* (2006.01)

(52) U.S. Cl.
CPC ........ *H02M 3/33584* (2013.01); *H02J 7/0054* (2013.01); *H02J 2007/0059* (2013.01); *H02M 3/3353* (2013.01); *H02M 2001/0058* (2013.01); *Y02B 70/1491* (2013.01)

(58) Field of Classification Search
CPC ........... H02M 3/33584; H02M 7/797; H02M 2007/4815; H02M 3/1582; H02M 5/10; H02M 5/225; H02M 5/293; H02M 5/297; H02M 5/458; H02M 3/33592; H02M 2001/0077; H02M 2001/0074; H02M 2001/008; H02M 2007/48
USPC .................................. 320/103–105, 137–143
See application file for complete search history.

(56) References Cited

U.S. PATENT DOCUMENTS 6,335,871 B1   1/2002   Kita et al.
2009/0059622 A1   3/2009   Shimada et al.
(Continued)

FOREIGN PATENT DOCUMENTS

DE         195 24 005 A1   4/1996
DE    11 2006 003 143 T5   10/2008
(Continued)

OTHER PUBLICATIONS

International Search Report issued Mar. 19, 2013, in PCT/JP12/082299, filed Dec. 13, 2012.
(Continued)

*Primary Examiner* — Binh Tat
(74) *Attorney, Agent, or Firm* — Oblon, McClelland, Maier & Neustadt, L.L.P

(57) ABSTRACT

In a DC/DC converter for bidirectional power transmission, a first switching circuit is connected between a first winding of a high-frequency transformer and a DC power supply, and a second switching circuit is connected between a second winding and a battery. In the first and second switching circuits, capacitors are connected in parallel to semiconductor switching devices, and first and second reactors are connected on AC input/output lines. Upon power transmission, the switching circuit on the primary side of the high-frequency transformer performs zero voltage switching, and the switching circuit on the secondary side performs a step-up operation by using the reactor.

15 Claims, 20 Drawing Sheets

(56) References Cited

U.S. PATENT DOCUMENTS

| | | |
|---|---|---|
| 2009/0171521 A1 | 7/2009 | Moki et al. |
| 2010/0220501 A1* | 9/2010 | Krause ............... H02M 3/33584 363/17 |
| 2011/0019440 A1 | 1/2011 | Shimada et al. |
| 2011/0128759 A1 | 6/2011 | Shimada et al. |
| 2011/0198933 A1 | 8/2011 | Ishigaki et al. |
| 2011/0242855 A1* | 10/2011 | Jovcic .................... H02M 3/07 363/17 |
| 2012/0020126 A1 | 1/2012 | Moki |
| 2012/0032633 A1* | 2/2012 | Cordes ................ B60L 11/1803 320/108 |
| 2013/0044519 A1 | 2/2013 | Teraura et al. |

FOREIGN PATENT DOCUMENTS

| | | |
|---|---|---|
| JP | 2005-224012 | 8/2005 |
| JP | 2006-230075 | 8/2006 |
| JP | 2009-055747 | 3/2009 |
| JP | 2009-177940 | 8/2009 |
| JP | 2010-093952 | 4/2010 |
| JP | 2011-130521 | 6/2011 |
| JP | 2011-193713 | 9/2011 |
| JP | 2011-234541 | 11/2011 |

OTHER PUBLICATIONS

Office Action issued Mar. 12, 2015 in German Patent Application No. 11 2012 005 868.2 (with English translation).

* cited by examiner

DC/DC CONVERTER

TECHNICAL FIELD

The present invention relates to a DC/DC converter in which the primary side and the secondary side are insulated by a transformer, and particularly, to a DC/DC converter capable of bidirectional power transmission between two DC power supplies.

BACKGROUND ART

A conventional bidirectional DC/DC converter includes a first switch interposed between one end of a primary winding of a transformer and a first voltage positive terminal, a second switch interposed between the one end of the primary winding and a first voltage negative terminal, a third switch interposed between the other end of the primary winding and the first voltage positive terminal, a fourth switch interposed between the other end of the primary winding and the first voltage negative terminal, a coil, a fifth switch interposed between one end of the coil and a second voltage positive terminal, a sixth switch interposed between the one end of the coil and a second voltage negative terminal, a seventh switch interposed between one end of a secondary winding and the other end of the coil, an eighth switch interposed between the one end of the secondary winding and the second voltage negative terminal, a ninth switch interposed between the other end of the secondary winding and the other end of the coil, and a tenth switch interposed between the other end of the secondary winding and the second voltage negative terminal (for example, see Patent Document 1).

In addition, another example of conventional bidirectional DC/DC converter includes a transformer connecting a voltage-type full-bridge circuit connected to a first power supply and a current-type switching circuit connected to a second power supply. A snubber capacitor is connected to each switching device of the voltage-type full-bridge circuit. A primary winding of the transformer, a resonance reactor, and a resonance capacitor are connected in series. A voltage clamp circuit composed of a switching device and a clamp capacitor is connected to the current-type switching circuit (for example, see Patent Document 2).

CITATION LIST

Patent Document

Patent Document 1: Japanese Laid-Open Patent Publication No. 2009-177940
Patent Document 2: Japanese Laid-Open Patent Publication No. 2009-55747

SUMMARY OF THE INVENTION

Problems to be Solved by the Invention

In the bidirectional DC/DC converter as shown in the above Patent Document 1, switching circuits are provided on both sides of the transformer, and a step-up chopper circuit is separately provided at the subsequent stage of the secondary-side switching circuit. Then, for the range of voltage that cannot be set by the primary-side voltage, the secondary-side voltage, and the turns ratio of the transformer, the step-up chopper circuit performs a step-up operation to adjust the voltage to target voltage. Therefore, there is a problem of increase in the number of components and increase in loss because of the step-up chopper circuit.

In addition, in the above Patent Document 2, switching loss is reduced by control using zero voltage switching. However, there is a problem that, when the power transmission direction is reversed, zero voltage switching cannot be performed, so that switching loss increases.

Further, in Patent Documents 1 and 2, since the primary side and the secondary side have different configurations, it is impossible to simply reverse the control when the power transmission direction is reversed, and output voltage excessively increases or decreases due to time delay until control switching. Thus, it is difficult to obtain stable output.

The present invention has been made to solve the above problems, and an object of the present invention is to provide a DC/DC converter that enables, with a simple circuit configuration, bidirectional power transmission in a wide voltage range and also realization of loss reduction, without separately providing a step-up circuit. Further, another object is to make it possible to perform control so as to swiftly follow change in the power transmission direction or sharp load change, thus obtaining stable output.

Solution to the Problems

A DC/DC converter according to the present invention performs bidirectional power transmission between a first DC power supply and a second DC power supply. The DC/DC converter includes: a transformer; a first converter section for converting power between DC and AC, the first converter section having a plurality of semiconductor switching devices and connected between the first DC power supply and a first winding of the transformer; a second converter section for converting power between DC and AC, the second converter section having a plurality of semiconductor switching devices and connected between the second DC power supply and a second winding of the transformer; and a control circuit for controlling each semiconductor switching device in the first and second converter sections. The first and second converter sections have capacitors respectively connected in parallel to the semiconductor switching devices, and first and second reactors connected on AC input/output lines. Upon power transmission from the first DC power supply to the second DC power supply, the control circuit controls each semiconductor switching device in the first converter section so as to perform zero voltage switching by using the first reactor. Upon power transmission from the second DC power supply to the first DC power supply, the control circuit controls each semiconductor switching device in the second converter section so as to perform zero voltage switching by using the second reactor.

Effect of the Invention

According to the above DC/DC converter, it becomes possible to perform bidirectional power transmission in a wide voltage range with a simple circuit configuration. In addition, it becomes possible to perform zero voltage switching irrespective of the power transmission direction and reduce loss owing to a decreased number of components.

Further, since the circuit configuration is symmetric with respect to the transformer, it becomes possible to perform bidirectional power transmission by simple control.

DESCRIPTION OF EMBODIMENTS

Embodiment 1

Hereinafter, embodiment 1 of the present invention will be described.

Figure 1:
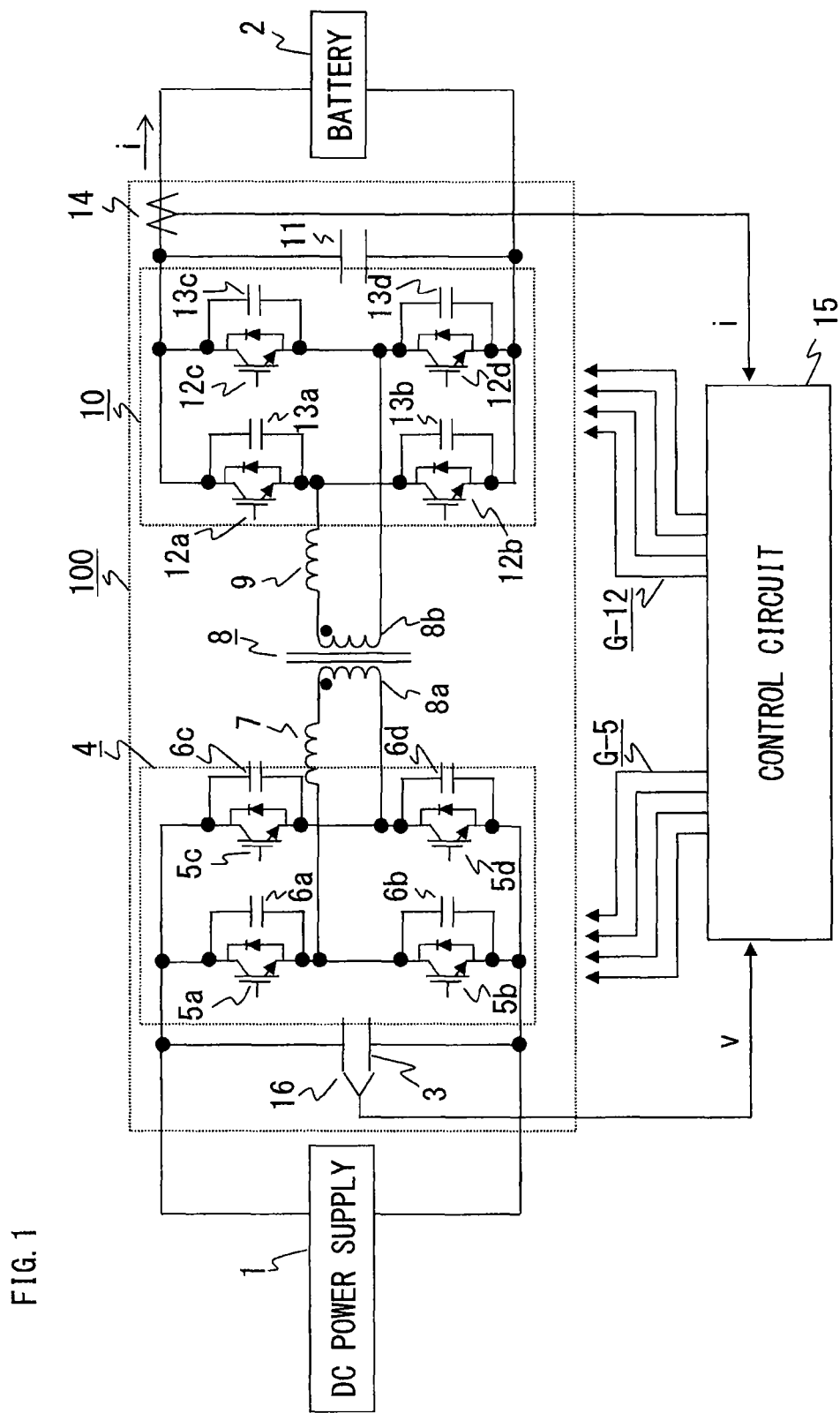
FIG. 1 is a circuit configuration diagram of a battery charge/discharge apparatus according to embodiment 1 of the present invention.

FIG. 1 is a diagram showing the circuit configuration of a battery charge/discharge apparatus as a DC/DC converter according to embodiment 1 of the present invention. As shown in FIG. 1, the battery charge/discharge apparatus performs bidirectional power conversion between a DC power supply 1 as a first DC power supply and a battery 2 as a second DC power supply, thereby performing charging and discharging of the battery 2.

The battery charge/discharge apparatus includes a DC/DC converter circuit 100 as a main circuit and a control circuit 15. The DC/DC converter circuit 100 includes a first smoothing capacitor 3 connected in parallel to the DC power supply 1, a first switching circuit 4 as a first converter section, a high-frequency transformer 8 as an insulated transformer, a second switching circuit 10 as a second converter section, and a second smoothing capacitor 11 connected in parallel to the battery 2.

The first switching circuit 4 is a full-bridge circuit having a plurality of semiconductor switching devices 5a to 5d composed of IGBT, MOSFET, or the like to which diodes are respectively connected in antiparallel. The DC side of the first switching circuit 4 is connected to the first smoothing capacitor 3, and the AC side is connected to a first winding 8a of the high-frequency transformer 8, so that bidirectional power conversion is performed between DC and AC. In addition, the first switching circuit 4 is a zero voltage switching circuit capable of causing the both-end voltage of each of the semiconductor switching devices 5a to 5d to be almost zero upon switching thereof, and capacitors 6a to 6d are respectively connected in parallel to the semiconductor switching devices 5a to 5d. In addition, on an AC input/output line between the semiconductor switching devices 5a to 5d and the high-frequency transformer 8, a first reactor 7 is connected, and the first reactor 7 and the first winding 8a are connected in series.

The second switching circuit 10 is a full-bridge circuit having a plurality of semiconductor switching devices 12a to 12d composed of IGBT, MOSFET, or the like to which diodes are respectively connected in antiparallel. The DC side of the second switching circuit 10 is connected to the second smoothing capacitor 11, and the AC side is connected to a second winding 8b of the high-frequency transformer 8, so that bidirectional power conversion is performed between DC and AC. In addition, the second switching circuit 10 is a zero voltage switching circuit capable of causing the both-end voltage of each of the semiconductor switching devices 12a to 12d to be almost zero upon switching thereof, and capacitors 13a to 13d are respectively connected in parallel to the semiconductor switching devices 12a to 12d. In addition, on an AC input/output line between the semiconductor switching devices 12a to 12d and the high-frequency transformer 8, a second reactor 9 is connected, and the second reactor 9 and the second winding 8b are connected in series.

In addition, between the second smoothing capacitor 11 and the battery 2, a current sensor 14 for detecting charge current i (an arrow indicates the positive direction) of the battery 2 is provided, and the sensed output is inputted to the control circuit 15. Further, a voltage sensor 16 for detecting voltage v of the first smoothing capacitor 3 is provided, and the sensed output is inputted to the control circuit 15. Based on the inputted values of current i and voltage v, the control circuit 15 generates drive signals G-5 and G-12 for performing switching control of the semiconductor switching devices 5a to 5d and 12a to 12d of the first and second switching circuits 4 and 10, thereby performing drive control of the first and second switching circuits 4 and 10.

Next, operation of the battery charge/discharge apparatus will be described below.

Figure 2:
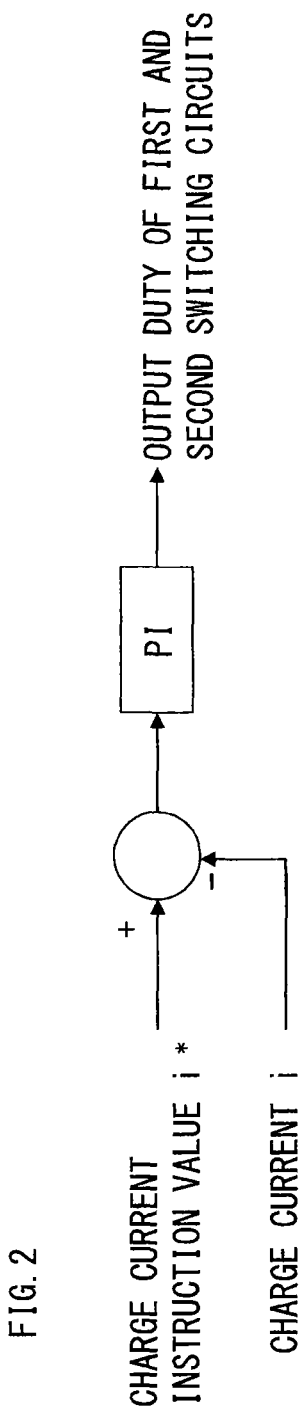
FIG. 2 is a control block diagram upon charging of the battery charge/discharge apparatus according to embodiment 1 of the present invention.

FIG. 2 is a control block diagram in the case of transmitting power from the DC power supply 1 to the battery 2, that is, charging the battery 2. The charge current i which is output current of the DC/DC converter circuit 100 is detected by the current sensor 14 and then inputted to the control circuit 15. As shown in FIG. 2, the control circuit 15 compares the inputted charge current i with a charge current instruction value i* and feeds back the difference, thereby determining output DUTY of the first switching circuit 4 and the second switching circuit 10 and determining the drive signals G-5 and G-12 for the semiconductor switching devices 5a to 5d and 12a to 12d.

In addition, voltage of the first smoothing capacitor 3 connected in parallel to the DC power supply 1 is the same DC voltage as that of the DC power supply 1.

Figure 3:
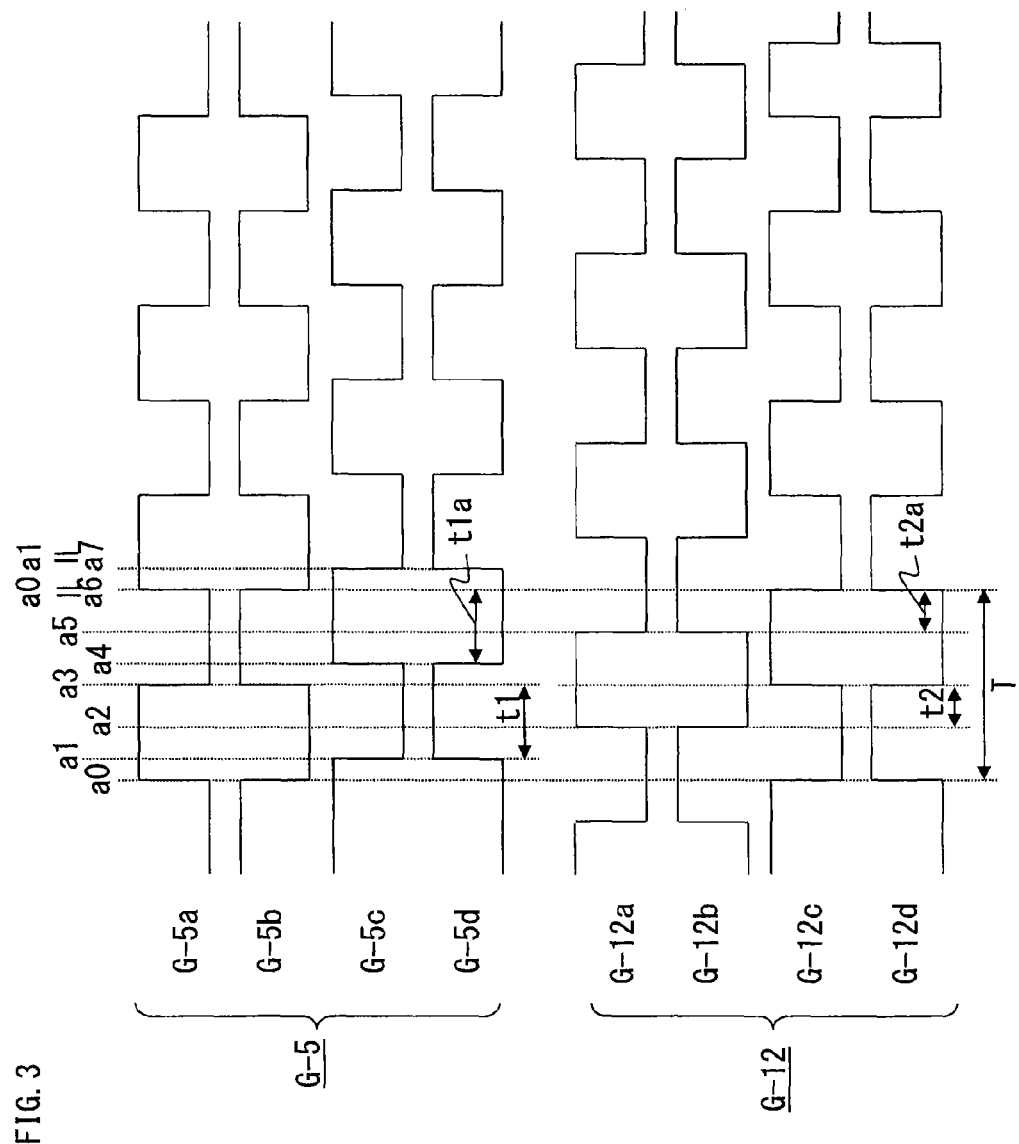
FIG. 3 is a drive signal waveform diagram of the battery charge/discharge apparatus according to embodiment 1 of the present invention.

FIG. 3 shows waveforms of the drive signals G-5 (G-5a to G-5d) and G-12 (G-12a to G-12d) for the semiconductor switching devices 5a to 5d and 12a to 12d of the first switching circuit 4 and the second switching circuit 10. As shown in FIG. 3, the phase of the drive signal for the semiconductor switching device 5a in the first switching circuit 4 coincides with the phase of the drive signal for the semiconductor switching device 12d in the second switching circuit 10. In this case, the semiconductor switching device 5a is a first reference device, and the semiconductor switching device 12d is a second reference device.

In addition, a period in which the semiconductor switching device 5d diagonally positioned with respect to the semiconductor switching device 5a (first reference device) is ON simultaneously with the semiconductor switching device 5a, is set at a first diagonal ON time t1, and a period in which the semiconductor switching device 12a diagonally positioned with respect to the semiconductor switching device 12d (second reference device) is ON simultaneously with the semiconductor switching device 12d, is set at a second diagonal ON time t1 . The cycle is set at T.

Here, the state in which two or more semiconductor switching devices are all ON is referred to as "simultaneously ON".

Waveforms of the drive signals G-5a and G-5d for the semiconductor switching devices 5a and 5b have the same ON time width and have phases inverted by 180 degrees from each other. Similarly, waveforms of the drive signals G-5c and G-5d have the same ON time width and have phases inverted by 180 degrees from each other. The same applies to the drive signals G-12a and G-12b and the drive signals G-12c and G-12d. The semiconductor switching devices 5a, 5c, 12a, and 12c on the positive side (high voltage side) and the semiconductor switching devices 5b, 5d, 12b, and 12d on the negative side (low voltage side), which compose bridge circuits of the first and second switching circuits 4 and 10 which are full-bridge circuits each having two bridge circuits, are each controlled at an ON time ratio of 50%. It is noted that the ON time ratio of 50% is a value in the case of ignoring a short-circuit prevention time set for preventing the positive-side semiconductor switching device and the negative-side semiconductor switching device from being turned on simultaneously. Actually, after the set short-circuit prevention time has elapsed since one was turned off, the other one is turned on.

In order that the semiconductor switching devices 5a to 5d and 12a to 12d perform zero voltage switching, the configuration is made such that, during the short-circuit prevention time, voltages of the capacitors 6a to 6d and 13a to 13d respectively connected in parallel to the semiconductor switching devices 5a to 5d and 12a to 12d increase to voltages of the first and second smoothing capacitors 3 and 11 or decrease to the vicinity of zero voltage.

In the case where voltage of the DC power supply 1 is set at V1, the first switching circuit 4 outputs a positive pulse with voltage V1 during the period (first diagonal ON time) t1 in which the semiconductor switching devices 5a and 5d are simultaneously ON, and a negative pulse with voltage (−V1) during a period t1 a in which the semiconductor switching devices 5b and 5c are simultaneously ON, to apply each pulse to the first winding 8a of the high-frequency transformer 8. In the case where the turns ratio between the first winding 8a and the second winding 8b of the high-frequency transformer 8 is set at N1 :N2, at this time, voltage of (±V1)×N2 /N1 is applied to the second winding 8b of the high-frequency transformer 8.

Based on FIGS. 3 and 4 to 9, operation of the DC/DC converter circuit 100 in one cycle will be described below. It is noted that voltage of the battery 2 is assumed to be higher than voltage generated on the second winding 8b.

At time a1, in the first switching circuit 4, the semiconductor switching device 5a is ON, and the semiconductor switching device 5c is turned off. Then, the semiconductor switching device 5d is turned on, whereby the semiconductor switching devices 5a and 5d are simultaneously ON. Then, current flows through a route passing the first smoothing capacitor 3, the semiconductor switching device 5a, the first reactor 7, the first winding 8a, the semiconductor switching device 5d, and then the first smoothing capacitor 3. Thus, positive voltage is applied to the first winding 8a of the high-frequency transformer 8, whereby positive voltage is generated on the second winding 8b. In addition, switching of the semiconductor switching devices 5c and 5d is performed in the state where the semiconductor switching device 5a is ON, and the capacitors 6c and 6d connected in parallel to the semiconductor switching devices 5c and 5d are charged or discharged, whereby the semiconductor switching devices 5c and 5d perform zero voltage switching.

Figure 4:
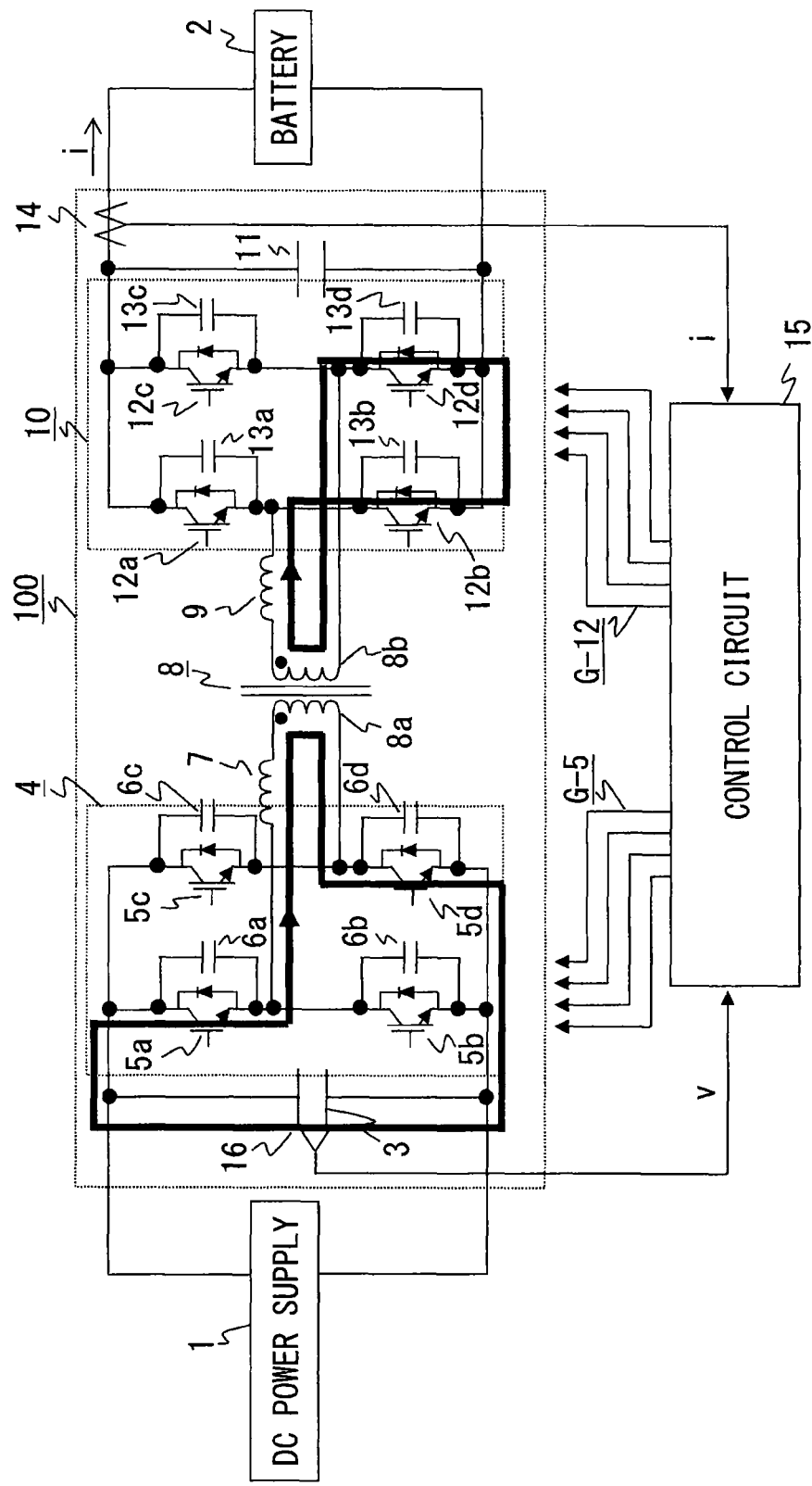
FIG. 4 is a diagram for explaining a charging operation of the battery charge/discharge apparatus according to embodiment 1 of the present invention.

In addition, in the second switching circuit 10, the semiconductor switching devices 12b and 12d are simultaneously ON, so that current flows through a route passing the second winding 8b, the second reactor 9, the semiconductor switching device 12b, the semiconductor switching device 12d, and then the second winding 8b, whereby the second reactor 9 is excited (FIG. 4).

Figure 5:
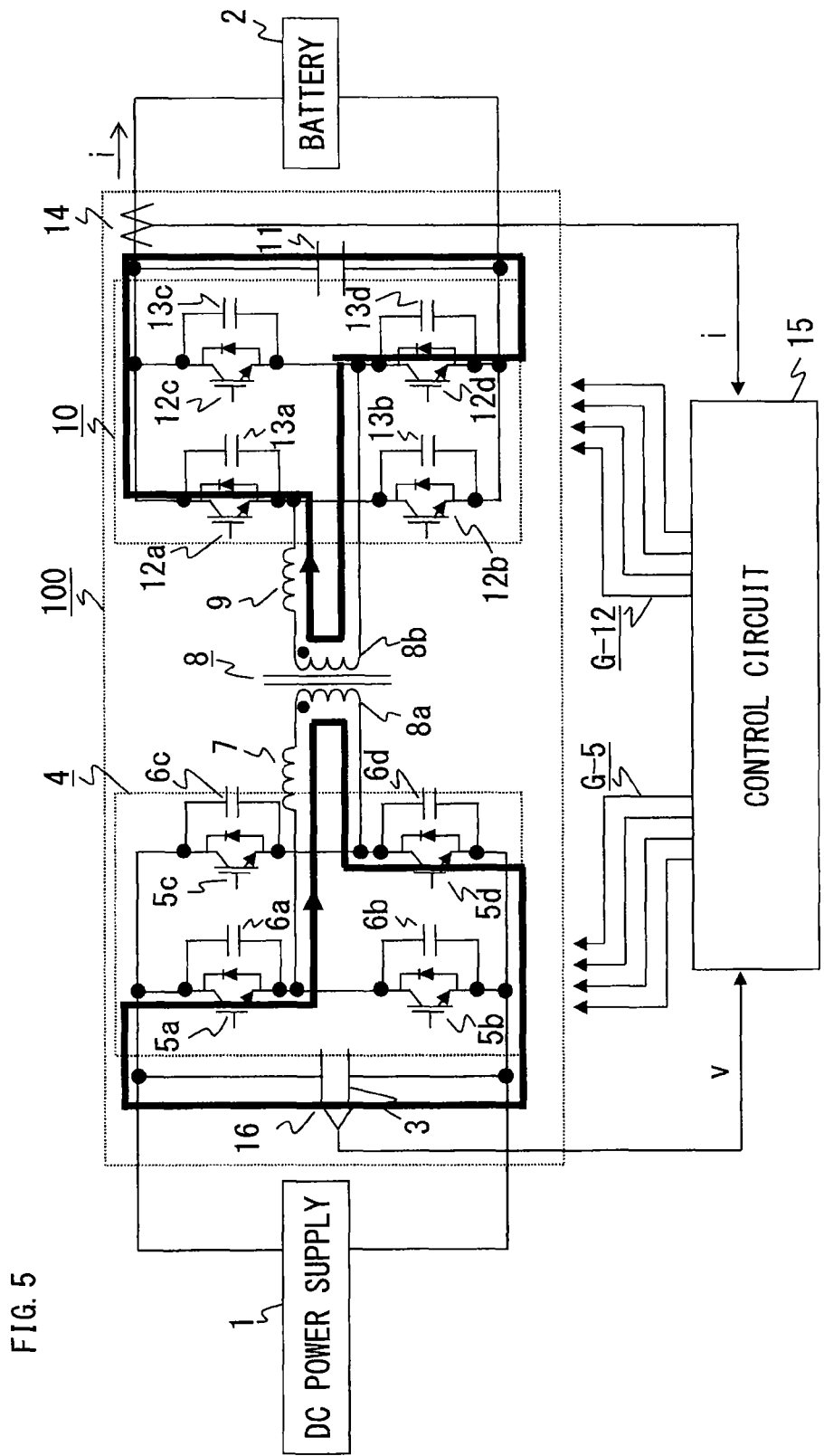
FIG. 5 is a diagram for explaining a charging operation of the battery charge/discharge apparatus according to embodiment 1 of the present invention.

At time a2, in the second switching circuit 10, the semiconductor switching device 12b is turned off, and then the semiconductor switching device 12a is turned on, so that current flows through a route passing the second winding 8b, the second reactor 9, the semiconductor switching device 12a, the second smoothing capacitor 11, the semiconductor switching device 12d, and then the second winding 8b, whereby excitation energy of the second reactor 9 is supplied to the second smoothing capacitor 11. At this time, switching of the semiconductor switching devices 12a and 12b is performed in the state where the semiconductor switching device 12d is ON, and the semiconductor switching devices 12a and 12b perform zero voltage switching by the effect of the respective capacitors 13a and 13b connected in parallel thereto (FIG. 5). It is noted that since connection to the second smoothing capacitor 11 is made through the antiparallel diode of the semiconductor switching device 12a, rectification can be performed even if the semiconductor switching device 12a is not turned on.

Figure 6:
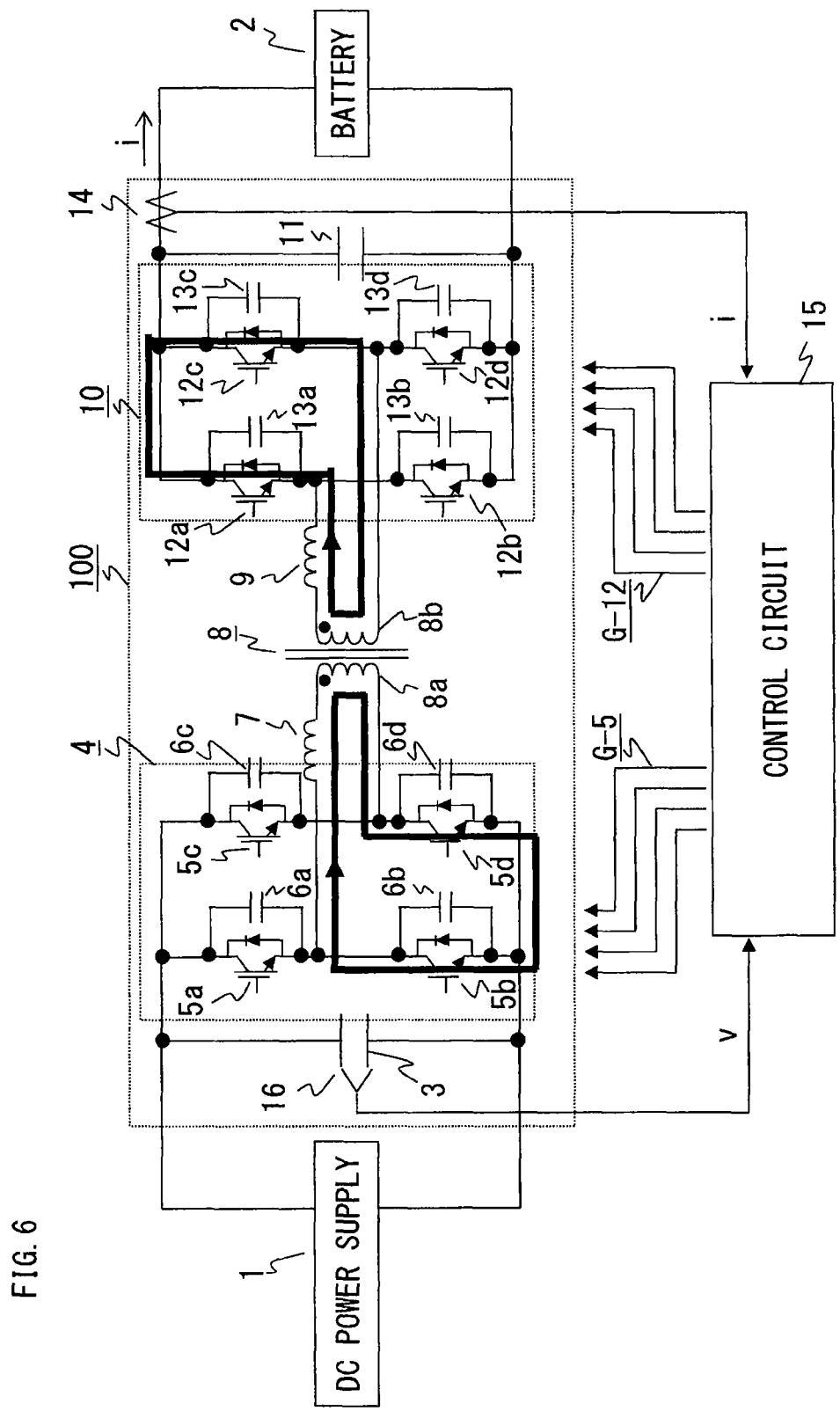
FIG. 6 is a diagram for explaining a charging operation of the battery charge/discharge apparatus according to embodiment 1 of the present invention.

At time a3, in the first and second switching circuits 4 and 10, the semiconductor switching devices 5a and 12d are turned off at the same timing, and then the semiconductor switching devices 5b and 12c are turned on at the same timing. In the first switching circuit 4 on the first winding 8a side of the high-frequency transformer 8, current circulates through a route passing the first reactor 7, the first winding 8a, the semiconductor switching device 5d, the semiconductor switching device 5b, and then the first reactor 7, so that voltage is not applied to the first winding 8a. As a result, in the second switching circuit 10 on the second winding 8b side, current flowing in the second reactor 9 circulates to flow also in the second winding 8b through a route passing the second reactor 9, the semiconductor switching device 12a, the semiconductor switching device 12c, the second winding 8b, and then the second reactor 9. In addition, at this time, in the first switching circuit 4, switching of the semiconductor switching devices 5a and 5b is performed in the state where the semiconductor switching device 5d is ON, and the semiconductor switching devices 5a and 5b perform zero voltage switching by the effect of the respective capacitors 6a and 6b connected in parallel thereto (FIG. 6).

At time a4, in the first switching circuit 4, the semiconductor switching device 5d is turned off, and then the semiconductor switching device 5c is turned on, whereby the semiconductor switching devices 5b and 5c are simultaneously ON. Then, current flows through a route passing the first smoothing capacitor 3, the semiconductor switching device 5c, the first winding 8a, the first reactor 7, the semiconductor switching device 5b, and then the first smoothing capacitor 3. As a result, negative voltage is applied to the first winding 8a of the high-frequency transformer 8, and negative voltage is generated on the second winding 8b. In addition, switching of the semiconductor switching devices 5c and 5d is performed in the state where the semiconductor switching device 5b is ON, and the semiconductor switching devices 5c and 5d perform zero voltage switching by the effect of the respective capacitors 6c and 6d connected in parallel thereto.

Figure 7:
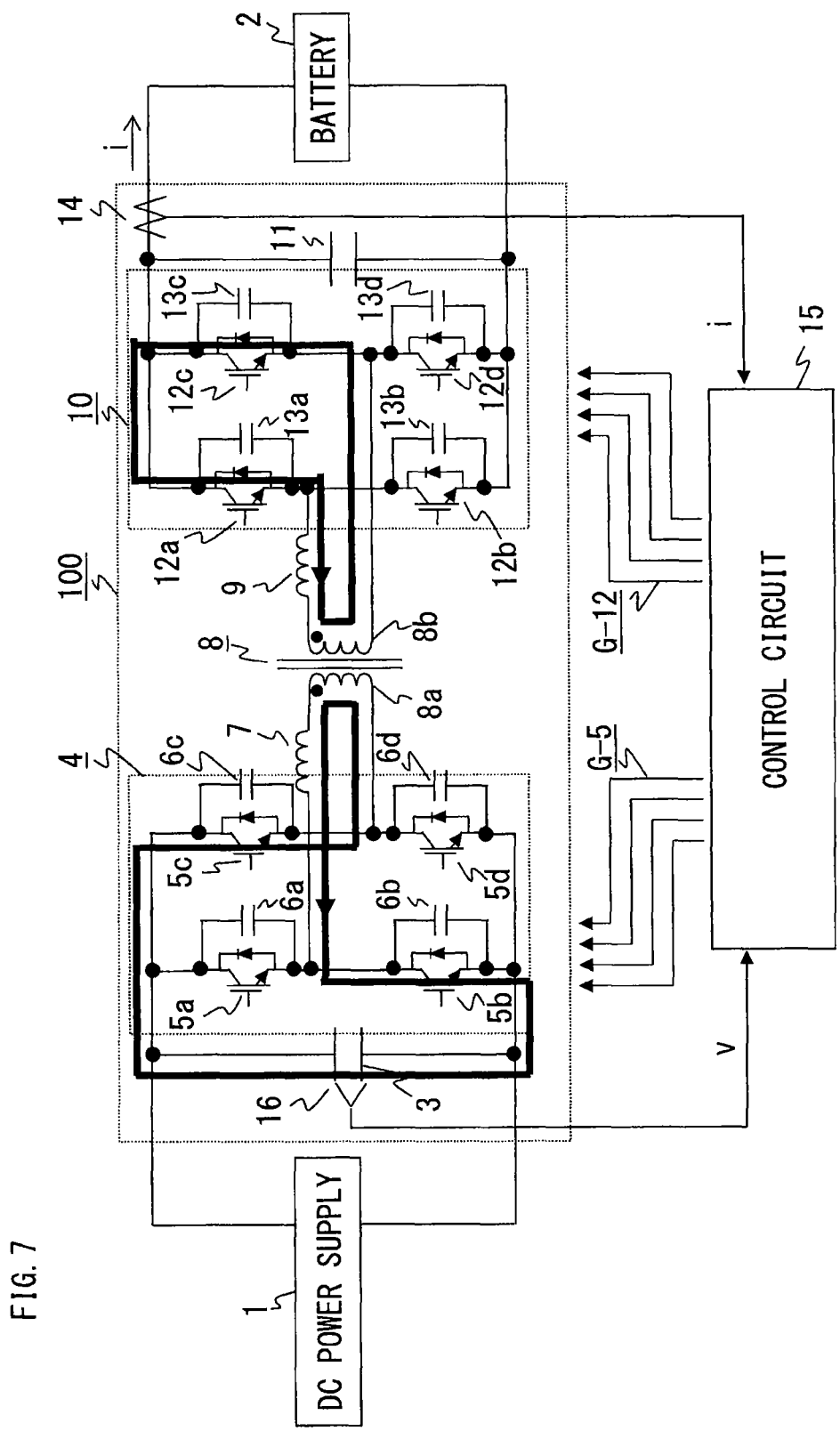
FIG. 7 is a diagram for explaining a charging operation of the battery charge/discharge apparatus according to embodiment 1 of the present invention.

In addition, in the second switching circuit 10, the semiconductor switching devices 12a and 12c are simultaneously ON, and current flows through a route passing the second winding 8b, the semiconductor switching device 12c, the semiconductor switching device 12a, the second reactor 9, and then the second winding 8b, whereby the second reactor 9 is excited at an opposite polarity (FIG. 7).

Figure 8:
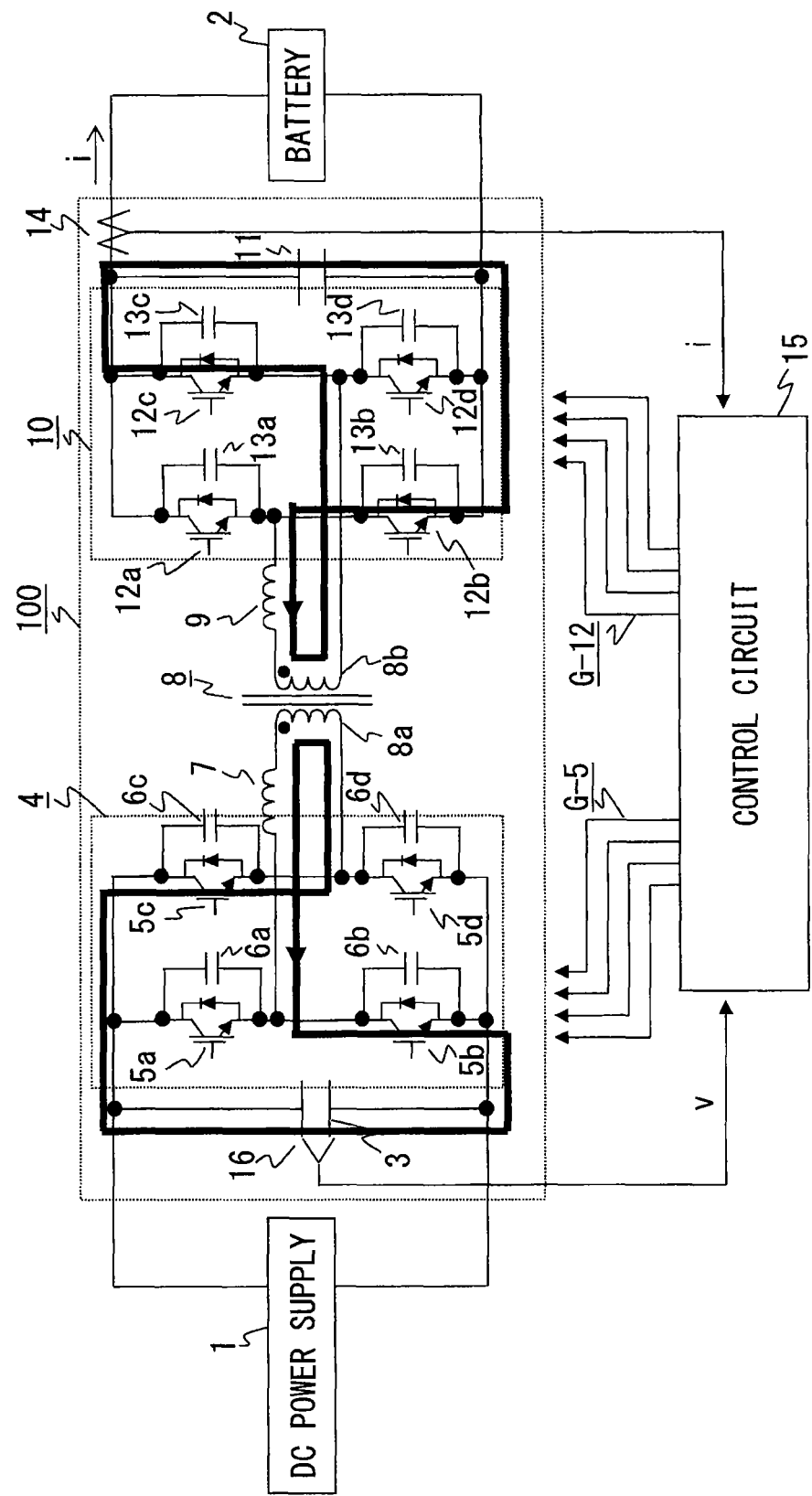
FIG. 8 is a diagram for explaining a charging operation of the battery charge/discharge apparatus according to embodiment 1 of the present invention.

At time a5, in the second switching circuit 10, the semiconductor switching device 12a is turned off, and then the semiconductor switching device 12b is turned on, so that current flows through a route passing the second winding 8b, the semiconductor switching device 12c, the second smoothing capacitor 11, the semiconductor switching device 12b, the second reactor 9, and then the second winding 8b, whereby excitation energy of the second reactor 9 is supplied to the second smoothing capacitor 11. At this time, switching of the semiconductor switching devices 12a and 12b is performed in the state where the semiconductor switching device 12c is ON, and the semiconductor switching devices 12a and 12b perform zero voltage switching by the effect of the respective capacitors 13a and 13b connected in parallel thereto (FIG. 8). It is noted that since connection to the second smoothing capacitor 11 is made through the antiparallel diode of the semiconductor switching device 12b, rectification can be performed even if the semiconductor switching device 12b is not turned on.

Figure 9:
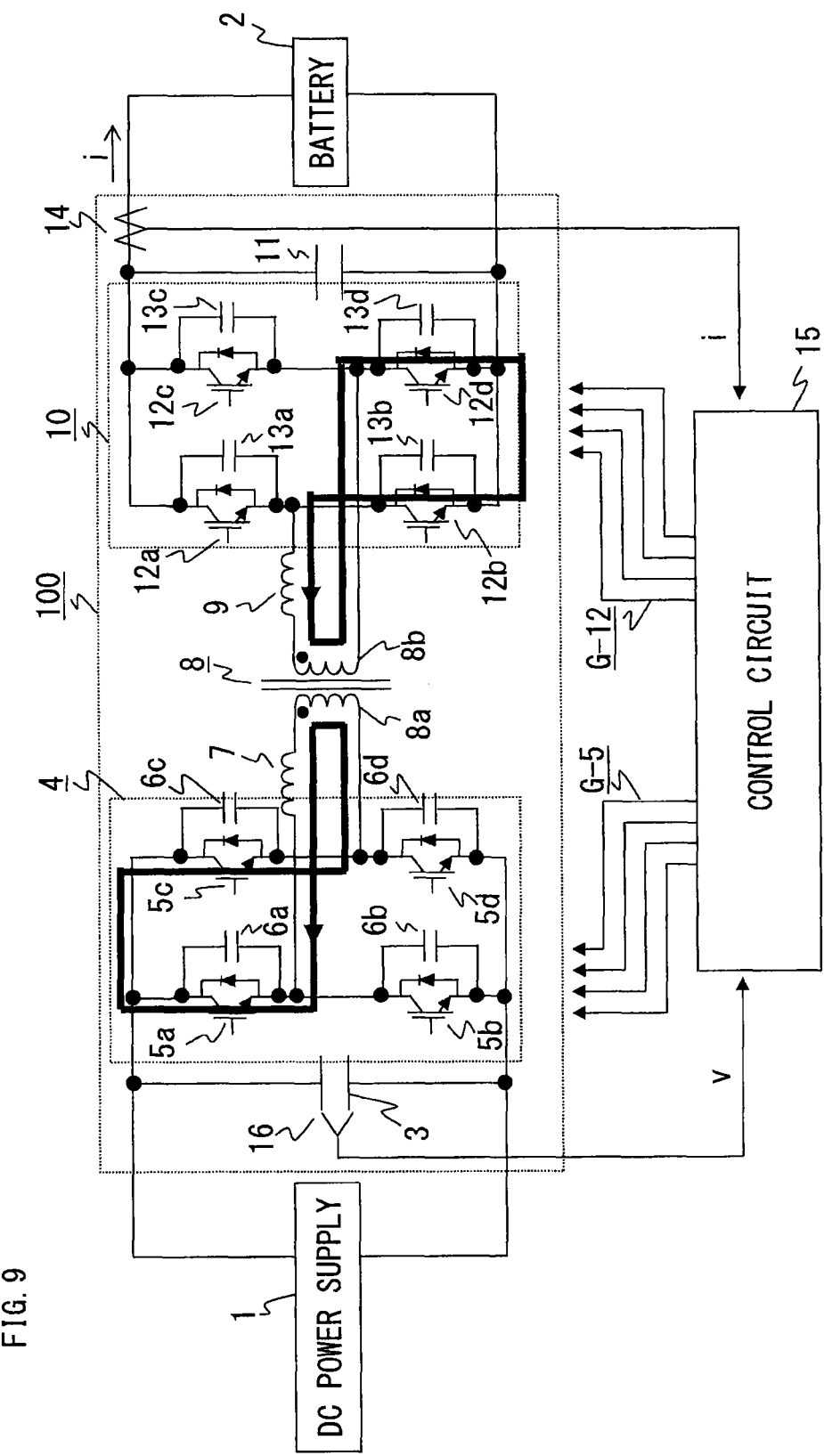
FIG. 9 is a diagram for explaining a charging operation of the battery charge/discharge apparatus according to embodiment 1 of the present invention.

At time a6 (=a0), in the first and second switching circuits 4, the semiconductor switching devices 5b and 12c are turned off at the same timing, and then the semiconductor switching devices 5a and 12d are turned on at the same timing. In the first switching circuit 4 on the first winding 8a side of the high-frequency transformer 8, current circulates through a route passing the first reactor 7, the semiconductor switching device 5a, the semiconductor switching device 5c, the first winding 8a, and then the first reactor 7, so that voltage is not applied to the first winding 8a. As a result, in the second switching circuit 10 on the second winding 8b side, current flowing in the second reactor 9 circulates to flow also in the second winding 8b through a route passing the second reactor 9, the second winding 8b, the semiconductor switching device 12d, the semiconductor switching device 12b, and then the second reactor 9. In addition, at this time, in the first switching circuit 4, switching of the semiconductor switching devices 5a and 5b is performed in the state where the semiconductor switching device 5c is ON, and the semiconductor switching devices 5a and 5b perform zero voltage switching by the effect of the respective capacitors 6a and 6b connected in parallel thereto (FIG. 9).

Thereafter, the control returns to time a1 (=a7).

By repeating such a series of controls (a1 to a6), voltage generated on the second winding 8b of the high-frequency transformer 8 is stepped up to supply power to the battery 2. In this case, in the second switching circuit 10, a period in which the second reactor 9 is excited is provided in the periods (t11 and t1 a) in which voltage is applied to the high-frequency transformer 8, that is, a step-up operation is performed by using the second reactor 9 as a step-up reactor.

In addition, all switching operations of the semiconductor switching devices 5a to 5d in the first switching circuit 4 on the primary side of the high-frequency transformer 8 are zero voltage switching by the effect of the capacitors 6a to 6d and the first reactor 7. It is noted that some of switching operations in the second switching circuit 10 on the secondary side are zero voltage switching.

Next, the case of transmitting power from the battery 2 to the DC power supply 1 will be described.

Figure 10:
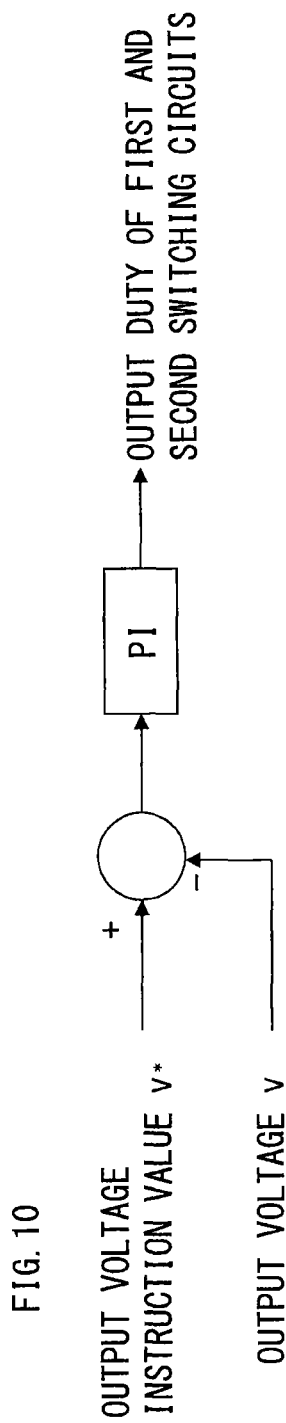
FIG. 10 is a control block diagram upon discharging of the battery charge/discharge apparatus according to embodiment 1 of the present invention

FIG. 10 is a control block diagram in the case of transmitting power from the battery 2 to the DC power supply 1, that is, discharging the battery 2. In this case, the DC/DC converter circuit 100 performs output to the DC power supply 1, and voltage v of the first smoothing capacitor 3 is output voltage. The output voltage v is detected by the voltage sensor 16 and then inputted to the control circuit 15. As shown in FIG. 10, the control circuit 15 compares the inputted output voltage v with an output voltage instruction value v* and feeds back the difference, thereby determining output DUTY of the first switching circuit 4 and the second switching circuit 10 and determining the drive signals G-5 and G-12 for the semiconductor switching devices 5a to 5d and 12a to 12d.

In the case where power is supplied from the battery 2, the operation direction is opposite to that in the case where power is supplied from the DC power supply 1, and therefore voltage of the second smoothing capacitor 11 connected in parallel to the battery 2 is the same DC voltage as that of the battery 2.

Figure 11:
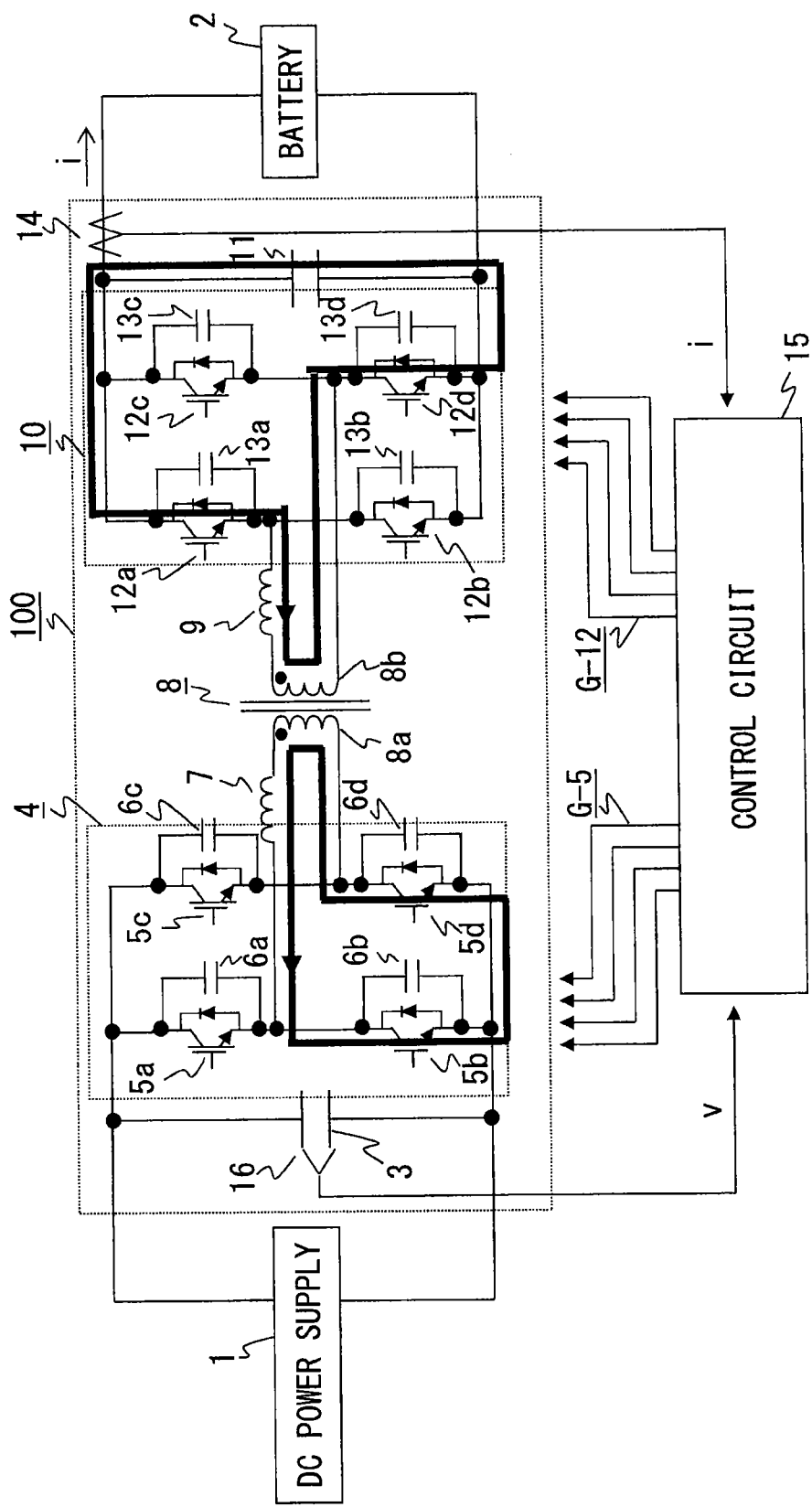
FIG. 11 is a diagram for explaining a discharging operation of the battery charge/discharge apparatus according to embodiment 1 of the present invention.

As shown in FIG. 11, in the second switching circuit 10, when the semiconductor switching devices 12a and 12d become simultaneously ON, current flows through a route passing the second smoothing capacitor 11, the semiconductor switching device 12a, the second reactor 9, the second winding 8b, the semiconductor switching device 12d, and then the second smoothing capacitor 11. As a result, positive voltage is applied to the second winding 8b of the high-frequency transformer 8, and positive voltage is generated on the first winding 8a.

In addition, in the first switching circuit 4, the semiconductor switching devices 5b and 5d are simultaneously ON, so that current flows through a route passing the first winding 8a, the first reactor 7, the semiconductor switching device 5b, the semiconductor switching device 5d, and then the first winding 8a, whereby the first reactor 7 is excited.

In the state shown in FIG. 11, the first and second switching circuits 4 and 10 are reversed with each other as compared to the state shown in FIG. 4 where power is transmitted from the DC power supply 1 to the battery 2. The DC/DC converter circuit 100 is configured such that the first and second switching circuits 4 and 10 sandwiching the high-frequency transformer 8 are symmetric with respect to the transformer 8. Therefore, in the case of transmitting power from the battery 2 to the DC power supply 1, control is performed by using the drive signals G-5 and G-12 for the first and second switching circuits 4 and 10 in a pattern opposite to the case of transmitting power from the DC power supply 1 to the battery 2, whereby power transmission can be performed in the same manner. It is noted that control using the drive signals G-5 and G-12 in an opposite pattern means that the correspondence relationship between the semiconductor switching devices are determined like the semiconductor switching device 12d corresponding to the semiconductor switching device 5a, the semiconductor switching device 12c corresponding to the semiconductor switching device 5b, the semiconductor switching device 12b corresponding to the semiconductor switching device 5c, and the semiconductor switching device 12a corresponding to the semiconductor switching device 5d, and the switching control pattern is reversed between the semiconductor switching devices corresponding to each other. Then, voltage generated on the first winding 8a of the high-frequency transformer 8 is stepped up to supply power to the DC power supply 1.

In this case, in the first switching circuit 4, a period in which the first reactor 7 is excited is provided in a period in which voltage is applied to the high-frequency transformer 8, that is, a step-up operation is performed by using the first reactor 7 as a step-up reactor.

In addition, all switching operations of the semiconductor switching devices 12a to 12d in the second switching circuit 10 on the primary side of the high-frequency transformer 8 are zero voltage switching by the effect of the capacitors 13a to 13d and the second reactor 9. It is noted that some of switching operations in the first switching circuit 4 on the secondary side are zero voltage switching.

Next, the first diagonal ON time t1 in which the semiconductor switching device 5a (first reference device) and the semiconductor switching device 5d are simultaneously ON, and the second diagonal ON time t2 in which the semiconductor switching device 12d (second reference device) and the semiconductor switching device 12a are simultaneously ON, will be described below.

In the control for charging the battery 2 from the DC power supply 1, a period in which power is transmitted from the first winding 8a to the second winding 8b of the high-frequency transformer 8 and voltage is generated on the second winding 8b is the period (first diagonal ON time t1) in which the semiconductor switching devices 5a and 5d are simultaneously ON and the period (t1 a) in which the semiconductor switching devices 5b and 5c are simultaneously ON. If this period is elongated as much as possible, loss relevant to the circulation periods in the first switching circuit 4 and the second switching circuit 10 can be reduced.

Therefore, in the control for transmitting power from the DC power supply 1 to the battery 2, the first diagonal ON time t1 is set so as to maximize the period in which voltage is applied to the first winding 8a of the high-frequency transformer 8. That is, the first diagonal ON time t1 is set at a maximum ON time tmax. The maximum ON time tmax is set based on a time taken for each of the semiconductor switching devices 5a to 5d of the first switching circuit 4 to perform zero voltage switching. It is noted that the period (t1 a) in which the semiconductor switching devices 5b and 5c are simultaneously ON is equal to the first diagonal ON time t1, and therefore this period is also set at the maximum ON time tmax.

On the other hand, in the control for transmitting power from the battery 2 to the DC power supply 1, the second diagonal ON time t2 in which the semiconductor switching devices 12a and 12d are simultaneously ON is set so as to maximize the period in which voltage is applied to the second winding 8b of the high-frequency transformer 8. That is, the second diagonal ON time t2 is set at the maximum ON time tmax. At this time, the period (t2 a) in which the semiconductor switching devices 12b and 12c are simultaneously ON is also set at the maximum ON time tmax.

Figure 12:
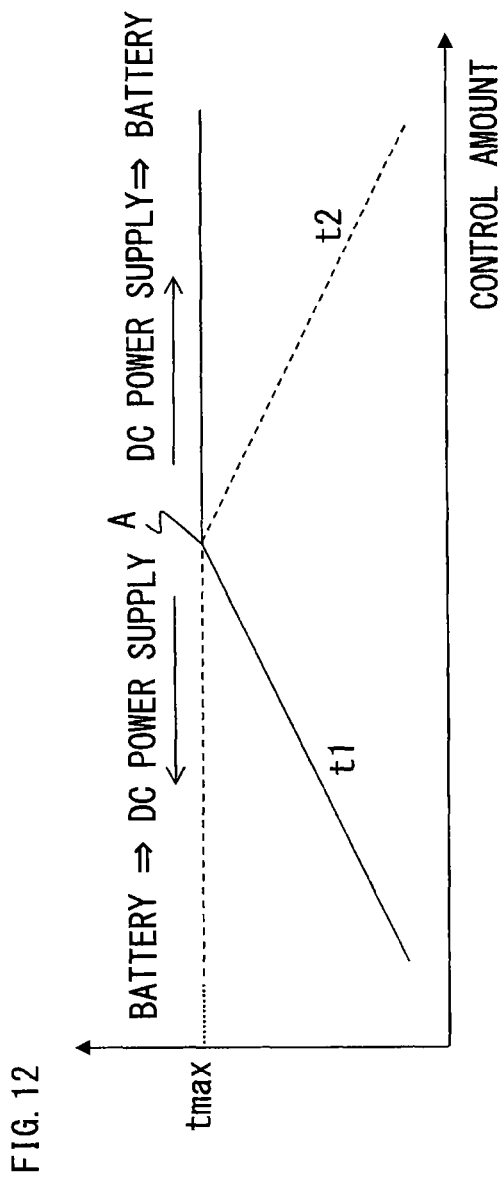
FIG. 12 is a diagram showing the relationship between diagonal ON times of drive signals for two switching circuits according to embodiment 1 of the present invention.

The control circuit 15 generates the drive signals G-5 and G-12 for the semiconductor switching devices 5a to 5d and 12a to 12d so that the first diagonal ON time t1 and the second diagonal ON time t2 satisfy a predetermined relationship. FIG. 12 is a diagram showing the relationship between the first diagonal ON time t1 and the second diagonal ON time t1 . In FIG. 12, the first diagonal ON time t1 is indicated by a solid line, and the second diagonal ON time t2 is indicated by a dotted line. "A" in FIG. 12 is a reference point A at which power transmitted between the DC power supply 1 and the battery 2 is 0, for example. On the right side from the reference point A, power transmission from the DC power supply 1 to the battery 2 is shown, and on the left side from the reference point A, power transmission from the battery 2 to the DC power supply 1 is shown. Also, the reference point A is a point at which both the first diagonal ON time t1 and the second diagonal ON time t2 become the maximum ON time tmax. As shown in FIG. 12, the control circuit 15 changes the first diagonal ON time t1 and the second diagonal ON time t1 , depending on the control amount in a direction of increasing the amount of power transmission from the DC power supply 1 to the battery 2.

Figure 13:
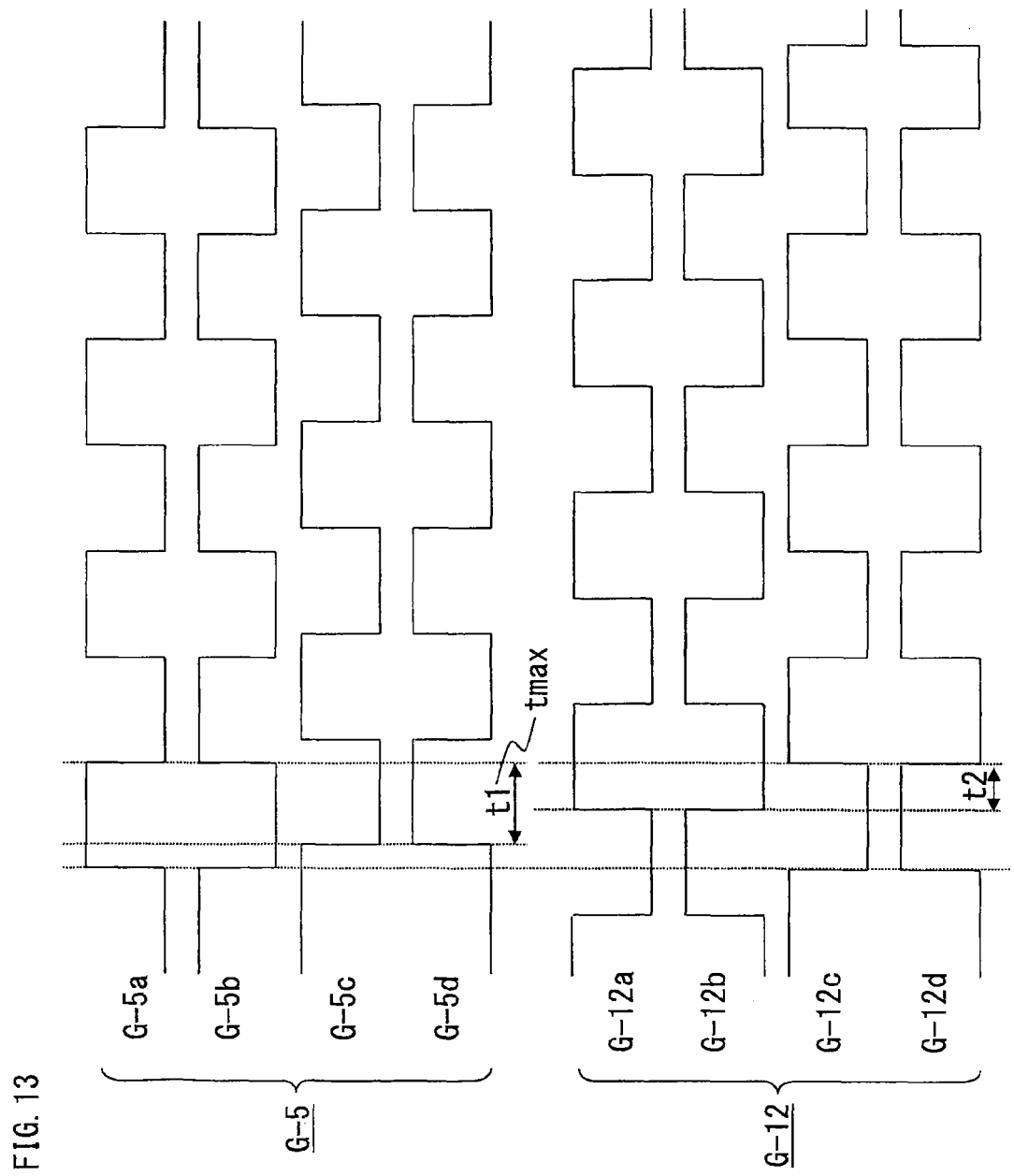
FIG. 13 is a drive signal waveform diagram upon charging of the battery charge/discharge apparatus according to embodiment 1 of the present invention.

In the case of transmitting power from the DC power supply 1 to the battery 2, if the first diagonal ON time t1 is equal to or smaller than the maximum ON time tmax, for example, in response to a result of the feedback control shown in FIG. 2, phases for driving the semiconductor switching devices 5c and 5d of the first switching circuit 4 are controlled to adjust the first diagonal ON time t1. At this time, in the second switching circuit 10, phases for driving the semiconductor switching devices 12a and 12b are controlled so that the second diagonal ON time t2 becomes the maximum ON time tmax. When the first diagonal ON time t1 has become the maximum ON time tmax, if it is necessary to further increase output by feedback control, as shown in FIG. 13, phases for driving the semiconductor switching devices 12a and 12b of the second switching circuit 10 are adjusted so as to decrease the second diagonal ON time t2 while keeping t1 =tmax.

Figure 14:
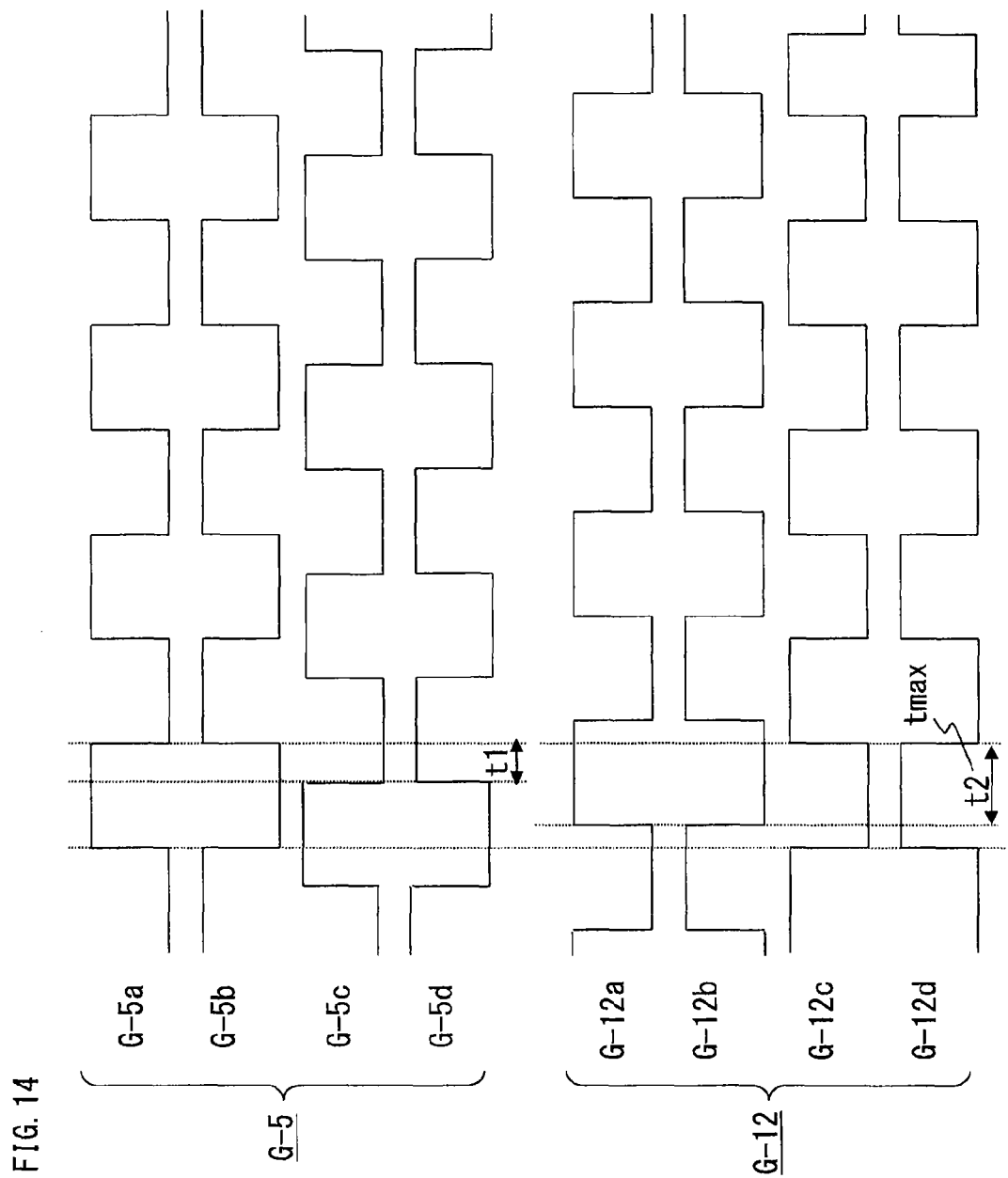
FIG. 14 is a drive signal waveform diagram upon discharging of the battery charge/discharge apparatus according to embodiment 1 of the present invention.

Similarly, also in the case of transmitting power from the battery 2 to the DC power supply 1, if the second diagonal ON time t2 is equal to or smaller than the maximum ON time tmax, for example, in response to a result of the feedback control shown in FIG. 10, phases for driving the semiconductor switching devices 12a and 12b of the second switching circuit 10 are controlled to adjust the second diagonal ON time t1. At this time, in the first switching circuit 4, phases for driving the semiconductor switching devices 5c and 5d are controlled so that the first diagonal ON time t1 becomes the maximum ON time tmax. When the second diagonal ON time t2 has become the maximum ON time tmax, if it is necessary to further increase output by feedback control, as shown in FIG. 14, phases for driving the semiconductor switching devices 5c and 5d of the first switching circuit 4 are adjusted so as to decrease the first diagonal ON time t1 while keeping t1 =tmax.

Thus, the control circuit 15 drives the semiconductor switching device 5a of the first switching circuit 4 and the semiconductor switching device 12d of the second switching circuit 10 by the drive signals G-5a and G-12d having the same phase. In the case of changing the first diagonal ON time t1, the control circuit 15 controls phases for driving the semiconductor switching devices 5c and 5d, and in the case of changing the second diagonal ON time t1, the control circuit 15 controls phases for driving the semiconductor switching devices 12a and 12b.

Irrespective of the power transmission direction, depending on the control amount in a direction of increasing the amount of power transmission from the DC power supply 1 to the battery 2, the first diagonal ON time t1 and the second diagonal ON time t2 are changed so as to satisfy the set relationship (relationship shown in FIG. 12). Thus, it becomes possible to perform bidirectional power conversion by controlling the DC/DC converter circuit 100 by the same drive control method irrespective of the power transmission direction. Thus, it becomes possible to realize bidirectional power conversion operation by simple control.

In addition, the first and second switching circuits 4 and 10 are configured so as to allow the semiconductor switching devices 5a to 5d and 12a to 12d to perform zero voltage switching, and are controlled so that, when each switching circuit becomes the primary side of the high-frequency transformer 8, zero voltage switching is performed therein. Each of the first and second reactors 7 and 9, which have exerted effects for zero voltage switching, is operated as a step-up reactor when being on the secondary side of the high-frequency transformer 8. Thus, it is possible to step up voltage by a step-up operation of the secondary-side switching circuit without separately providing a step-up circuit.

For example, upon power transmission from the DC power supply 1 to the battery 2, by a step-up circuit being formed by the second reactor 9, the second switching circuit 10, and the second smoothing capacitor 11, voltage generated on the second winding 8b of the high-frequency transformer 8 can charge the battery 2 even when voltage of the battery 2 is higher than the voltage generated on the second winding 8b.

Therefore, it is possible to perform bidirectional power transmission in a wide voltage range with a simple circuit configuration. In addition, zero voltage switching can be performed irrespective of the power transmission direction, and loss can be reduced because the number of components is decreased.

It is noted that the turns ratio of the high-frequency transformer 8, and the first and second reactors 7 and 9 can be each optimally designed in accordance with each voltage range of the DC power supply 1 and the battery 2.

Figure 15:
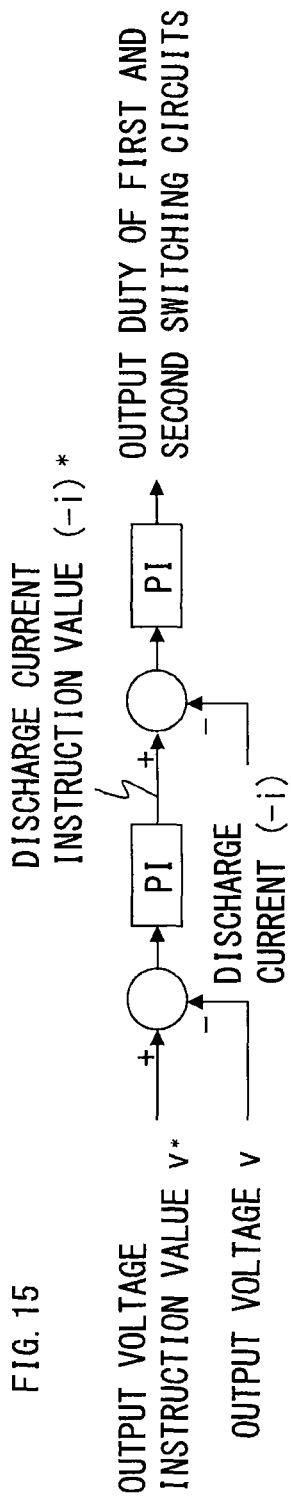
FIG. 15 is a control block diagram in another example upon discharging of the battery charge/discharge apparatus according to embodiment 1 of the present invention.

Upon power transmission from the battery 2 to the DC power supply 1, although feedback control is performed so that the output voltage v to the DC power supply 1 follows the output voltage instruction value v* in the above embodiment, control shown below may be performed. As shown in FIG. 15, the difference between the output voltage instruction value v* and the output voltage v is fed back to generate a discharge current instruction value (−i)* for the battery 2. Then, output DUTY of the first and second switching circuits is determined by feedback control so that discharge current (−i) obtained by inverting the sign of the charge current i of the battery 2 detected by the current sensor 14 coincides with the discharge current instruction value (−i)*.

Specifically, when the difference obtained by subtracting the output voltage v from the output voltage instruction value v* is positive, the discharge current instruction value (−i)* having a positive polarity is generated. The state where the discharge current instruction value is positive indicates the state where the power transmission direction is retained in the direction from the battery 2 to the DC power supply 1. Then, the first diagonal ON time t1 of the first switching circuit 4 is adjusted so that the discharge current (−i) from the battery 2 to the DC power supply 1 coincides with the discharge current instruction value (−i)*. At this time, the second diagonal ON time t2 of the second switching circuit 10 is kept at the maximum ON time tmax.

When the difference obtained by subtracting the output voltage v from the output voltage instruction value v* is negative, the discharge current instruction value (−i)* having a negative polarity is generated. The state where the discharge current instruction value is negative indicates the state where the power transmission direction has been switched to be the direction from the DC power supply 1 to the battery 2. Then, the second diagonal ON time t2 of the second switching circuit 10 is adjusted so that the discharge current (−i) coincides with the discharge current instruction value (−i)*. At this time, the first diagonal ON time t1 of the first switching circuit 4 is kept at the maximum ON time tmax.

Thus, the control circuit 15 can realize the bidirectional control shown in FIG. 12, based on only charge/discharge current ±i flowing between the DC power supply 1 and the battery 2. It is noted that in FIG. 12, the control amount in a direction of increasing the amount of power transmission from the DC power supply 1 to the battery 2 is the charge current i.

Thus, the control based on only the charge/discharge current ±i provides the following effects. For example, while power is being supplied from the battery 2 to the DC power supply 1 side, when a load connected to the DC power supply 1 suddenly decreases, output voltage on the DC power supply 1 side increases. At this time, the difference between the output voltage instruction value v* and the output voltage v becomes minus, so that the discharge current instruction value (−i)* for the battery 2 also becomes minus, that is, changes to an instruction value for charging the battery 2, i.e., a current instruction value for charging the battery 2 with energy corresponding to the overvoltage of the DC power supply 1. Then, current is controlled so as to follow the current instruction value, whereby the operation can be continued through consistent control without changing the control method even in the case where the current (power) transmission direction is reversed. Thus, it becomes possible to stably continue the operation even in the case of sudden change in the load.

In addition, in the case of performing control by using the relationship between the first diagonal ON time t1 and the second diagonal ON time t2 shown in FIG. 12, for example, when power is transmitted from the DC power supply 1 to the battery 2, if the amount of power transmission reaches the reference point A and then is further decreased, the first diagonal ON time t1 is controlled to be decreased, whereby the first switching circuit 4 is controlled to perform a step-down operation. When power is transmitted from the battery 2 to the DC power supply 1, if the amount of power transmission reaches the reference point A and then is further decreased, the second diagonal ON time t2 is controlled to be decreased, whereby the second switching circuit 10 is controlled to perform a step-down operation.

Thus, irrespective of the current (power) transmission direction, and further, whether a step-up operation or a step-down operation, the operation can be continued through consistent control without changing the control method.

In the above description, the semiconductor switching device 5a of the first switching circuit 4 and the semiconductor switching device 12d of the second switching circuit 10 are driven by the drive signals G-5a and G-12d having the same phase. This is equivalent to driving the semiconductor switching device 5b and the semiconductor switching device 12c by the drive signals G-5b and G-12c having the same phase. The combination of the first reference device and the second reference device to be driven by the drive signals having the same phase may be another combination. For example, a combination of the semiconductor switching device 5c and the semiconductor switching device 12b, or a combination of the semiconductor switching device 5d and the semiconductor switching device 12a may be employed, whereby the same effect can be obtained.

Embodiment 2

In the above embodiment 1, the semiconductor switching device 5a of the first switching circuit 4 and the semiconductor switching device 12d of the second switching circuit 10 are controlled by the drive signals having the same phase. Control other than this will be described below. It is noted that the circuit configuration of the battery charge/discharge apparatus is the same as in the above embodiment 1.

Figure 16:
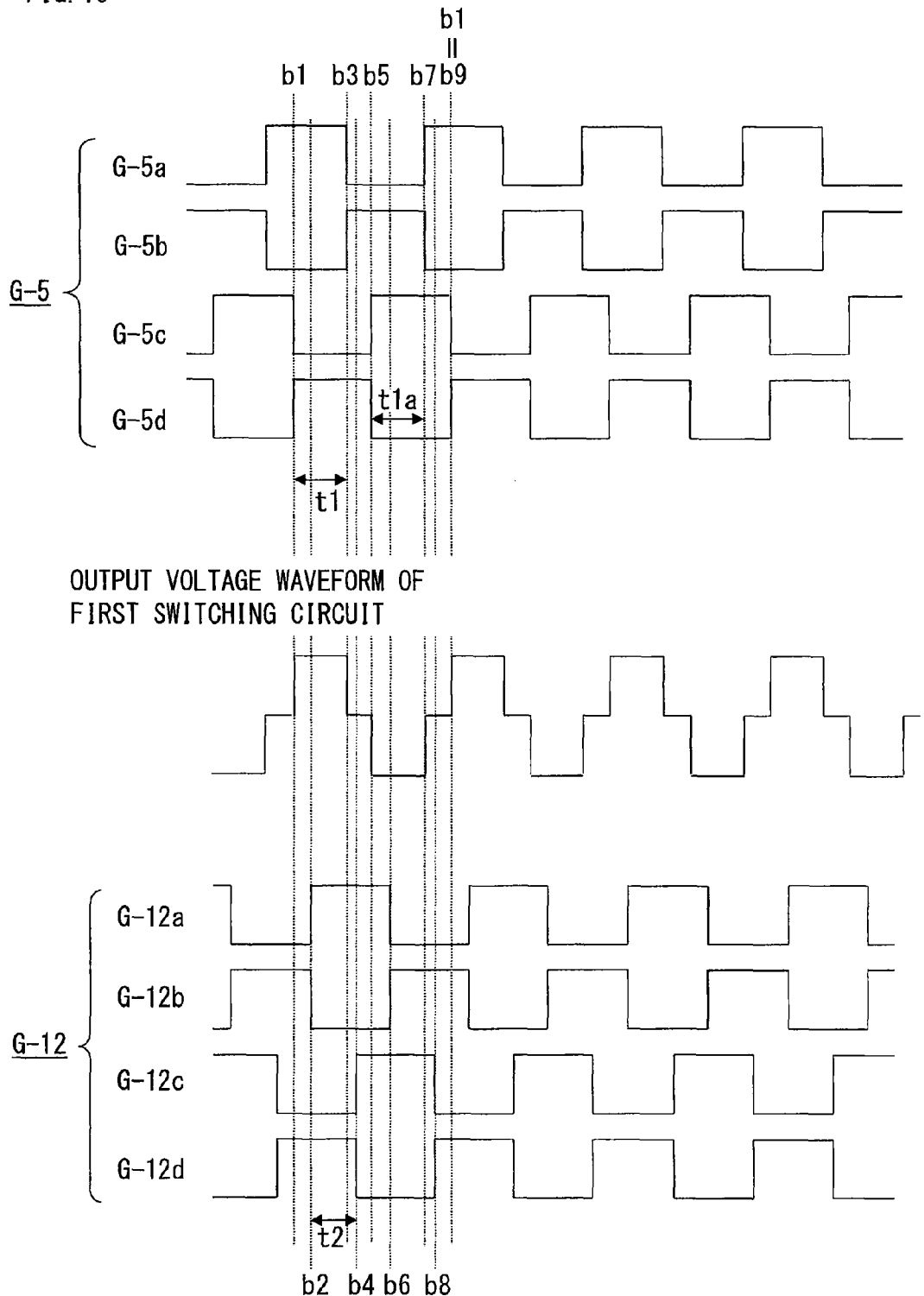
FIG. 16 is a drive signal waveform diagram upon charging of a battery charge/discharge apparatus according to embodiment 2 of the present invention.

FIG. 16 shows waveforms of the drive signals G-5 (G-5a to G-5d) and G-12 (G-12a to G-12d) for the semiconductor switching devices 5a to 5d and 12a to 12d of the first switching circuit 4 and the second switching circuit 10 according to embodiment 2.

As in the above embodiment 1, if a short-circuit prevention time is ignored, the positive-side semiconductor switching devices and the negative-side semiconductor switching devices composing the bridge circuits of the first and second switching circuits 4 and 10 are each controlled at an ON time ratio of 50%. In addition, in order that the semiconductor switching devices 5a to 5d and 12a to 12d perform zero voltage switching, the configuration is made such that, during the short-circuit prevention time, voltages of the capacitors 6a to 6d and 13a to 13d respectively connected in parallel to the semiconductor switching devices 5a to 5d and 12a to 12d increase to voltages of the first and second smoothing capacitors 3 and 11 or decrease to the vicinity of zero voltage.

In the case where voltage of the DC power supply 1 is set at V1, the first switching circuit 4 outputs a positive pulse with voltage V1 during the period (first diagonal ON time) t11 in which the semiconductor switching devices 5a and 5d are simultaneously ON, and a negative pulse with voltage (−V1) during a period t1 a in which the semiconductor switching devices 5b and 5c are simultaneously ON, to apply each pulse to the first winding 8a of the high-frequency transformer 8. In the case where the turns ratio between the first winding 8a and the second winding 8b of the high-frequency transformer 8 is set at N1:N2, at this time, voltage of (±V1)×N2 /N1 is applied to the second winding 8b of the high-frequency transformer 8. An output voltage waveform of the first switching circuit 4 shown in FIG. 16 is the waveform of voltage applied to the first winding 8a, and if the magnitude is ignored, this waveform is the same as that of voltage generated on the second winding 8b.

Upon power transmission from the DC power supply 1 to the battery 2, as in the case shown in FIG. 2 in the above embodiment 1, the control circuit 15 compares the inputted charge current i with a charge current instruction value i* and feeds back the difference, thereby determining output DUTY of the first switching circuit 4 and the second switching circuit 10 and determining the drive signals G-5 and G-12 for the semiconductor switching devices 5a to 5d and 12a to 12d.

Operation of the DC/DC converter circuit 100 in one cycle will be described below. It is noted that voltage of the battery 2 is assumed to be higher than voltage generated on the second winding 8b.

At time b1, by the same control as that at time a1 in the above embodiment 1, in the first switching circuit 4, the semiconductor switching device 5a is ON, and the semiconductor switching device 5c is turned off. Then, the semiconductor switching device 5d is turned on, whereby the semiconductor switching devices 5a and 5d are simultaneously ON. In the second switching circuit 10, the semiconductor switching devices 12b and 12d are simultaneously ON. As a result, current flows through the current route shown in FIG. 4, so that positive voltage is applied to the first winding 8a of the high-frequency transformer 8, positive voltage is generated on the second winding 8b, and the second reactor 9 is excited.

At time b2, by the same control as that at time a2 in the above embodiment 1, in the second switching circuit 10, the semiconductor switching device 12b is turned off, and then the semiconductor switching device 12a is turned on. As a result, current flows through the current route shown in FIG. 5, so that excitation energy of the second reactor 9 is supplied to the second smoothing capacitor 11.

At time b3, in the first switching circuit 4, the semiconductor switching device 5a is turned off, and then the semiconductor switching device 5b is turned on. As a result, current flows through a current route shown in FIG. 17, that is, in the first switching circuit 4 on the first winding 8a side of the high-frequency transformer 8, current circulates through a route passing the first reactor 7, the first winding 8a, the semiconductor switching device 5d, the semiconductor switching device 5b, and then the first reactor 7, so that voltage is not applied to the first winding 8a.

At time b4, in the second switching circuit 4, the semiconductor switching device 12d is turned off, and then the semiconductor switching device 12c is turned on. As a result, current flows through the current route shown in FIG. 6, that is, in the second switching circuit 10 on the second winding 8b side, current flowing in the second reactor 9 circulates to flow also in the second winding 8b through a route passing the second reactor 9, the semiconductor switching device 12a, the semiconductor switching device 12c, the second winding 8b, and then the second reactor 9.

At time b5, by the same control as that at time a4 in the above embodiment 1, in the first switching circuit 4, the semiconductor switching device 5d is turned off, and then the semiconductor switching device 5c is turned on, whereby the semiconductor switching devices 5b and 5c are simultaneously ON. In the second switching circuit 10, the semiconductor switching devices 12a and 12c are simultaneously ON. As a result, current flows through the current route shown in FIG. 7, so that negative voltage is applied to the first winding 8a of the high-frequency transformer 8, negative voltage is generated on the second winding 8b, and the second reactor 9 is excited at an opposite polarity.

At time b6, by the same control as that at time a5 in the above embodiment 1, in the second switching circuit 10, the semiconductor switching device 12a is turned off, and then the semiconductor switching device 12b is turned on. As a result, current flows through the current route shown in FIG. 8, so that excitation energy of the second reactor 9 is supplied to the second smoothing capacitor 11.

At time b7, in the first switching circuit 4, the semiconductor switching device 5b is turned off, and then the semiconductor switching device 5a is turned on. As a result, current flows through a current route shown in FIG. 18, that is, in the first switching circuit 4 on the first winding 8a side of the high-frequency transformer 8, current circulates through a route passing the first reactor 7, the semiconductor switching device 5a, the semiconductor switching device 5c, the first winding 8a, and then the first reactor 7, so that voltage is not applied to the first winding 8a.

At time b8, in the second switching circuit 4, the semiconductor switching device 12c is turned off, and then the semiconductor switching device 12d is turned on. As a result, current flows through the current route shown in FIG. 9, that is, in the second switching circuit 10 on the second winding 8b side, current flowing in the second reactor 9 circulates to flow also in the second winding 8b through a route passing the second reactor 9, the second winding 8b, the semiconductor switching device 12d, the semiconductor switching device 12b, and then the second reactor 9.

Thereafter, the control returns to time b1 (=a9).

By repeating such a series of controls (b1 to b8), voltage generated on the second winding 8b of the high-frequency transformer 8 is stepped up to supply power to the battery 2. In determining output DUTY of the first and second switching circuits 4 and 10 and performing control, the control circuit 15 determines the diagonal ON time t1 (=t1 a) in which two semiconductor switching devices diagonally positioned in the first switching circuit 4 are simultaneously ON, and the diagonal ON time t2 in which two semiconductor switching devices diagonally positioned in the second switching circuit 10 are simultaneously ON, and further, performs control so as to provide periods (times b1 and b2 and times b5 and b6) in which the second reactor 9 is excited, in the periods (t1l and t1a) in which voltage is applied to the high-frequency transformer 8. Thus, the second switching circuit 10 performs a step-up operation by using the second reactor 9 as a step-up reactor.

In addition, also in embodiment 2, as in the above embodiment 1, all switching operations of the semiconductor switching devices 5a to 5d in the first switching circuit 4 on the primary side of the high-frequency transformer 8 are zero voltage switching by the effect of the capacitors 6a to 6d and the first reactor 7, and some of switching operations in the second switching circuit 10 on the secondary side are zero voltage switching.

Next, the case of transmitting power from the battery 2 to the DC power supply 1 will be described. As in the case shown in FIG. 10 in the above embodiment 1, the control circuit 15 compares inputted output voltage v with an output voltage instruction value v* and feeds back the difference, thereby determining output DUTY of the first switching circuit 4 and the second switching circuit 10 and determining the drive signals G-5 and G-12 for the semiconductor switching devices 5a to 5d and 12a to 12d.

The DC/DC converter circuit 100 is configured such that the first and second switching circuits 4 and 10 are symmetric with respect to the high-frequency transformer 8. Therefore, in the case of transmitting power from the battery 2 to the DC power supply 1, control is performed by using the drive signals G-5 and G-12 for the first and second switching circuits 4 and 10 in a pattern opposite to the case of transmitting power from the DC power supply 1 to the battery 2, whereby power transmission can be performed in the same manner. Then, voltage generated on the first winding 8a of the high-frequency transformer 8 is stepped up to supply power to the DC power supply 1.

Then, in the first switching circuit 4, a period in which the first reactor 7 is excited is provided in the periods in which voltage is applied to the high-frequency transformer 8, that is, a step-up operation is performed by using the first reactor 7 as a step-up reactor.

In addition, all switching operations of the semiconductor switching devices 12a to 12d in the second switching circuit 10 on the primary side of the high-frequency transformer 8 are zero voltage switching by the effect of the capacitors 13a to 13d and the second reactor 9, and some of switching operations in the first switching circuit 4 on the secondary side are zero voltage switching.

Also in the present embodiment, a period in which power is transmitted from the primary-side winding to the secondary-side winding of the high-frequency transformer 8 is elongated as much as possible, whereby loss relevant to the circulation periods in the first switching circuit 4 and the second switching circuit 10 can be reduced.

Therefore, in the control for transmitting power from the DC power supply 1 to the battery 2, the first switching circuit 4 is controlled so that a period in which voltage is applied to the first winding 8a of the high-frequency transformer 8, that is, the diagonal ON time t1l becomes a predetermined maximum time. In the control for transmitting power from the battery 2 to the DC power supply 1, the second switching circuit 10 is controlled so that a period in which voltage is applied to the second winding 8b of the high-frequency transformer 8, that is, the diagonal ON time t2 becomes a predetermined maximum time.

The maximum times of the diagonal ON times t1l and t2 are set based on times taken for the semiconductor switching devices 5a to 5d and 12a to 12d to perform zero voltage switching.

As described above, the first and second switching circuits 4 and 10 are configured so as to allow the semiconductor switching devices 5a to 5d and 12a to 12d to perform zero voltage switching, and are controlled so that, when each switching circuit becomes the primary side of the high-frequency transformer 8, zero voltage switching is performed therein. Each of the first and second reactors 7 and 9, which have exerted effects for zero voltage switching, is operated as a step-up reactor when being on the secondary side of the high-frequency transformer 8. Thus, it is possible to step up voltage by a step-up operation of the secondary-side switching circuit without separately providing a step-up circuit.

For example, upon power transmission from the DC power supply 1 to the battery 2, by a step-up circuit being formed by the second reactor 9, the second switching circuit 10, and the second smoothing capacitor 11, voltage generated on the second winding 8b of the high-frequency transformer 8 can charge the battery 2 even when voltage of the battery 2 is higher than the voltage generated on the second winding 8b.

Therefore, it is possible to perform bidirectional power transmission in a wide voltage range with a simple circuit configuration. In addition, zero voltage switching can be performed irrespective of the power transmission direction, and loss can be reduced because the number of components is decreased.

Embodiment 3

In the above embodiment 2, the case where the battery charge/discharge apparatus outputs higher voltage than voltage generated on the winding of the high-frequency transformer 8 has been described. In the present embodiment, the case where the output voltage is lower than voltage generated on the winding of the high-frequency transformer 8 will be described.

First, in the case of transmitting power from the DC power supply 1 to the battery 2, the semiconductor switching devices 12a to 12d in the second switching circuit 10 are all turned off. At this time, when the semiconductor switching devices 5a and 5d of the first switching circuit 4 have become simultaneously ON, as in the case shown in FIG. 5, on the first winding 8a of the high-frequency transformer 8, current flows through a route passing the first smoothing capacitor 3, the semiconductor switching device 5a, the first reactor 7, the first winding 8a, the semiconductor switching device 5d, and then the first smoothing capacitor 3, whereby power is transmitted. At this time, on the second winding 8b side of the high-frequency transformer 8, current flows through a route passing the second winding 8b, the second reactor 9, the antiparallel diode of the semiconductor switching device 12a, the second smoothing capacitor 11, the antiparallel diode of the semiconductor switching device 12d, and then the second winding 8b.

Figure 17:
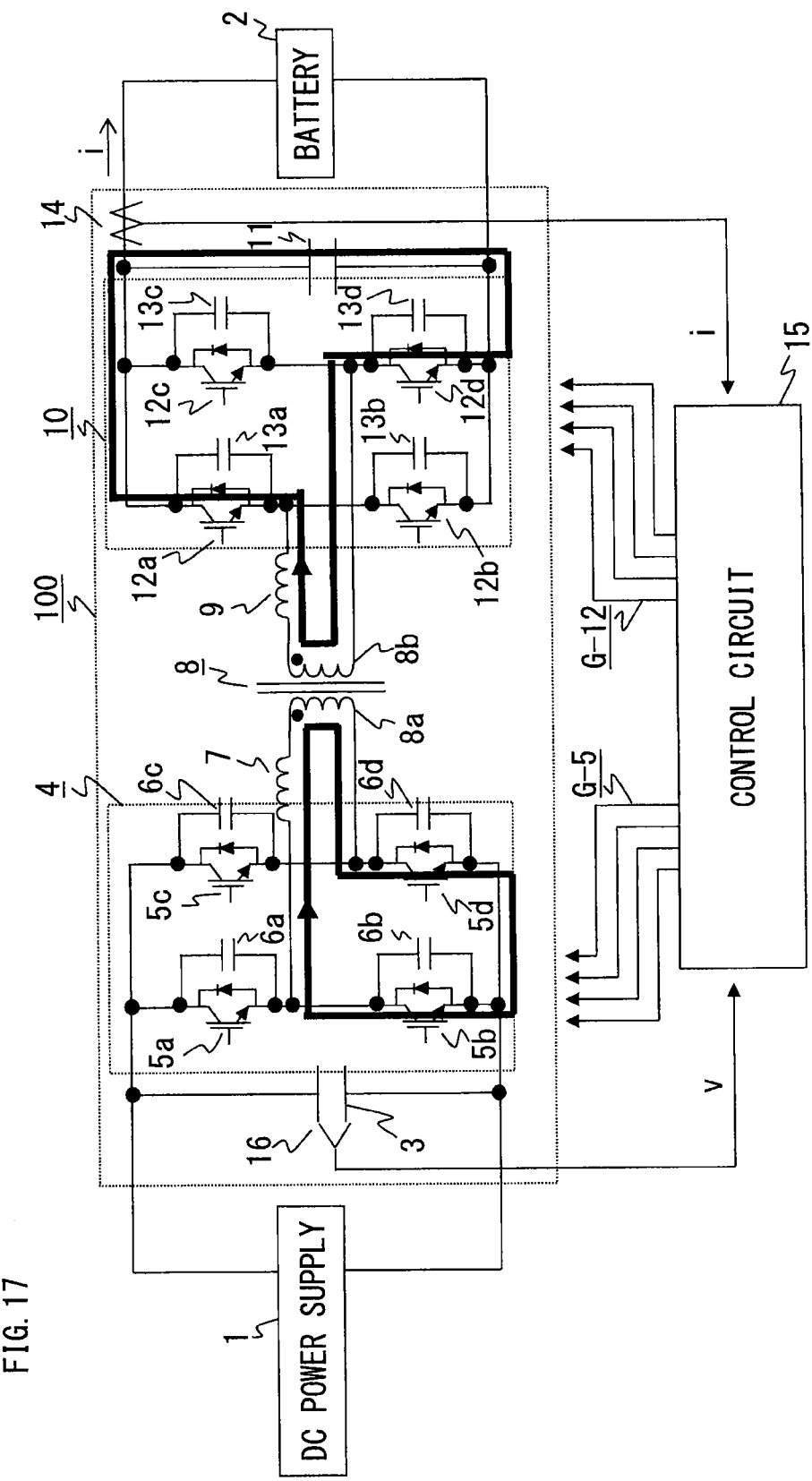
FIG. 17 is a diagram for explaining a charging operation of the battery charge/discharge apparatus according to embodiment 2 of the present invention.

Next, in the first switching circuit 4, the semiconductor switching device 5a is turned off, and then the semiconductor switching device 5b is turned on, so that, as in the case shown in FIG. 17, on the first winding 8a side of the high-frequency transformer 8, current flows through a route passing the first reactor 7, the first winding 8a, the semiconductor switching device 5d, the semiconductor switching device 5b, and then the first reactor 7. At this time, on the second winding 8b side of the high-frequency transformer 8, current flows through a route passing the second reactor 9, the antiparallel diode of the semiconductor switching device 12a, the second smoothing capacitor 11, the antiparallel diode of the semiconductor switching device 12d, the second winding 8b, and then the second reactor 9. Then, when current flowing in the second reactor 9 has become zero, current on the second winding 8b side of the high-frequency transformer 8 disappears.

Next, in the first switching circuit 4, the semiconductor switching device 5d is turned off, and then the semiconductor switching device 5c is turned on, so that, as in the case shown in FIG. 8, on the first winding 8a side of the high-frequency transformer 8, current flows through a route passing the first smoothing capacitor 3, the semiconductor switching device 5c, the first winding 8a, the first reactor 7, the semiconductor switching device 5b, and then the first smoothing capacitor 3, whereby power is transmitted. At this time, on the second winding 8b side of the high-frequency transformer 8, current flows through a route passing the second winding 8b, the antiparallel diode of the semiconductor switching device 12c, the first smoothing capacitor 11, the antiparallel diode of the semiconductor switching device 12b, the second reactor 9, and then the second winding 8b.

Figure 18:
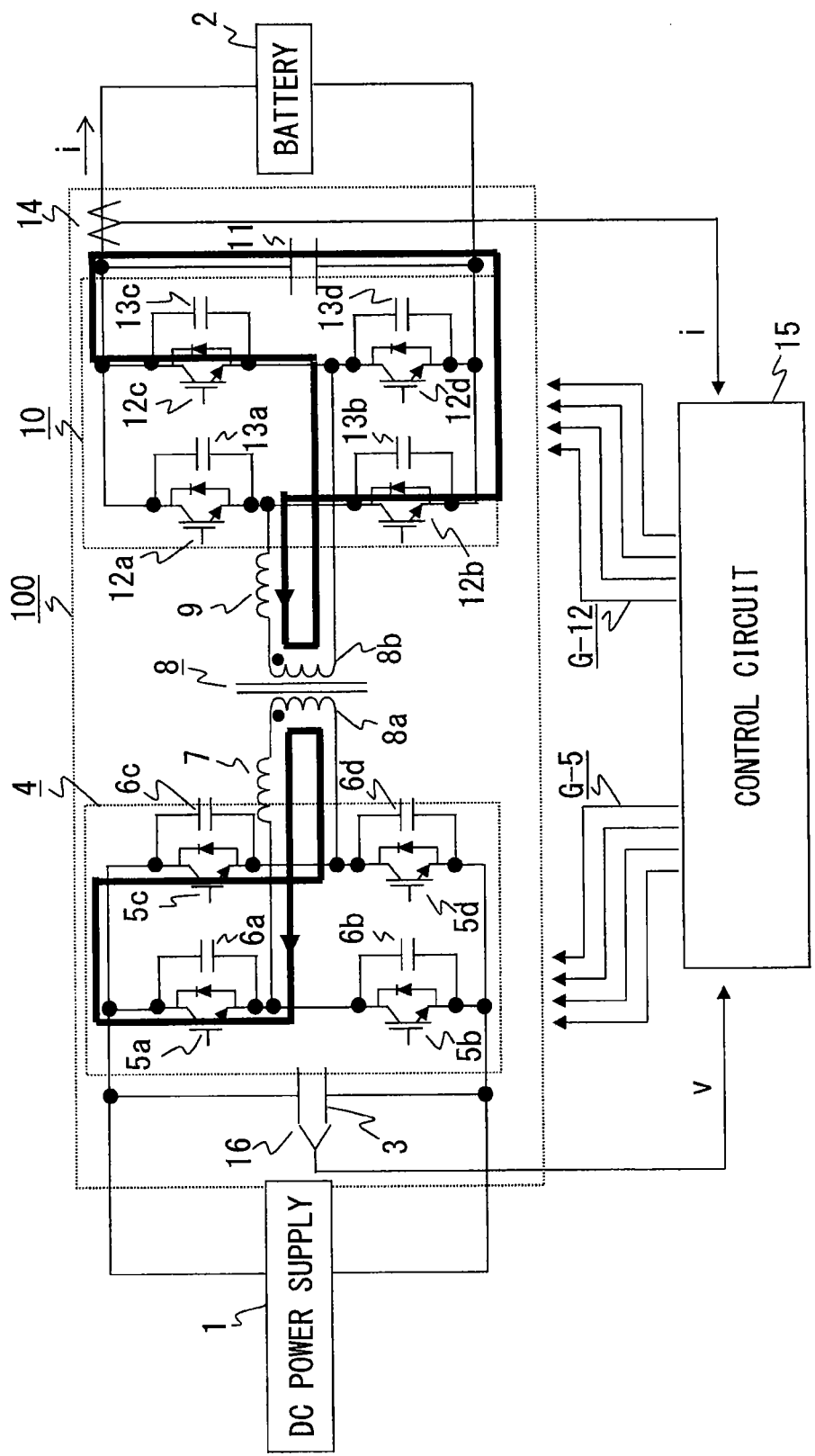
FIG. 18 is a diagram for explaining a charging operation of the battery charge/discharge apparatus according to embodiment 2 of the present invention.

Next, in the first switching circuit 4, the semiconductor switching device 5b is turned off, and then the semiconductor switching device 5a is turned on, so that, as in the case shown in FIG. 18, on the first winding 8a side of the high-frequency transformer 8, current flows through a route passing the first reactor 7, the semiconductor switching device 5a, the semiconductor switching device 5c, the first winding 8a, and then the first reactor 7. At this time, on the second winding 8b side of the high-frequency transformer 8, the current route does not change, and when current flowing in the second reactor 9 has become zero, current on the second winding 8b side disappears.

By repeating a series of operations described above, the second switching circuit 10 performs a rectification operation and power is transmitted from the DC power supply 1 to the battery 2. Control for the charge current i of the battery 2 is realized by controlling DUTY of the diagonal ON time in which the two semiconductor switching devices 5a and 5d (5b and 5c) diagonally positioned in the first switching circuit 4 are simultaneously ON.

On the other hand, in the case of transmitting power from the battery 2 to the DC power supply 1, an operation in the direction opposite to the above operation is performed. The operation is realized by controlling DUTY of the diagonal ON time in which the two semiconductor switching devices 12a and 12d (12b and 12c) diagonally positioned in the second switching circuit 10 are simultaneously ON, and by the first switching circuit 4 performing a rectification operation.

By the DC/DC converter circuit 100 thus operating, in the case of power transmission with lower voltage than voltage generated on the secondary-side winding 8b (8a) of the high-frequency transformer 8, the drive signals for the semiconductor switching devices 12a to 12d (5a to 5d) in the secondary-side switching circuit 10 (4) can be stopped, whereby control simplification can be realized.

In addition, also in the present embodiment, the first and second switching circuits 4 and 10 are configured so as to allow the semiconductor switching devices 5a to 5d and 12a to 12d to perform zero voltage switching, and are controlled so that, when each switching circuit becomes the primary side of the high-frequency transformer 8, zero voltage switching is performed therein.

In addition, if the control of the above embodiment 2 is used in the case where power transmission with higher voltage than voltage generated on the secondary-side winding 8b (8a) is desired, and the control of the present embodiment is used in the case where power transmission with lower voltage than voltage generated on the secondary-side winding 8b (8a) is desired, bidirectional power transmission can be performed in a wide voltage range with a simple circuit configuration. In addition, zero voltage switching can be performed irrespective of the power transmission direction, and loss can be reduced because the number of components is decreased.

Embodiment 4

In the above embodiment 3, in the switching circuit 10 (4) on the secondary side of the high-frequency transformer 8, a rectification operation is performed in the state where the semiconductor switching devices 12a to 12d (5a to 5d) are all turned off. However, in accordance with winding voltage generated on the high-frequency transformer 8, the semiconductor switching devices 12a to 12d (5a to 5d) of the secondary-side switching circuit 10 (4) may be turned on. In this case, devices that allow bidirectional conduction, such as MOSFET, are used for the semiconductor switching devices 5a to 5d (12a to 12d).

Upon power transmission from the DC power supply 1 to the battery 2, the semiconductor switching devices 12a to 12d in the second switching circuit 10 are controlled in synchronization with a timing at which voltage is applied to the first winding 8a of the high-frequency transformer 8, whereby the second switching circuit 10 performs a rectification operation. Upon power transmission from the battery 2 to the DC power supply 1, the semiconductor switching devices 5a to 5d in the first switching circuit 4 are controlled in synchronization with a timing at which voltage is applied to the second winding 8b of the high-frequency transformer 8, whereby the first switching circuit 4 performs a rectification operation.

In the case where the semiconductor switching devices 5a to 5d and 12a to 12d are composed of, for example, MOSFET, each both-ends voltage in a conductive state is lower than ON voltage of the antiparallel diode. Therefore, since current flows on the MOSFET side by the synchronous rectification operation as described above, conduction loss can be reduced.

Embodiment 5

In the above embodiment 1, the battery 2 is used for the second DC power supply, and voltage control for the DC power supply 1 is performed only when power is transmitted from the battery 2 to the DC power supply 1. At this time, the control can be applied in which the polarity of the discharge current instruction value for the battery 2 is switched in accordance with the polarity of the difference obtained by subtracting the output voltage from the output voltage instruction value for the DC power supply 1. Such control can be applied also to power transmission from the DC power supply 1 to the second DC power supply. In the present embodiment 5, voltage control for a DC power supply on a power receiving side is performed in bidirectional power transmission.

Figure 19:
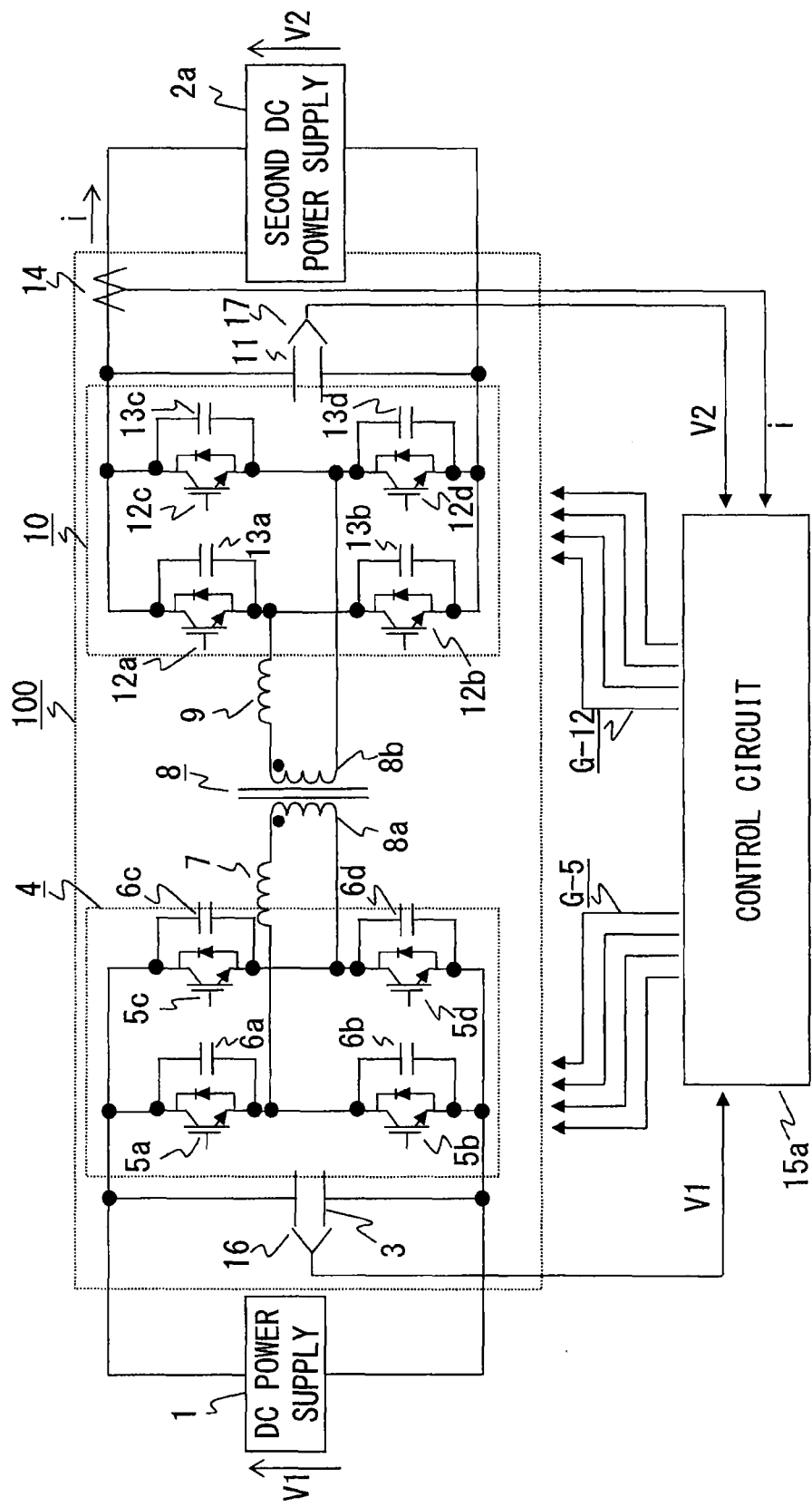
FIG. 19 is a circuit configuration diagram of a DC power supply charge/discharge apparatus according to embodiment 5 of the present invention.

FIG. 19 is a diagram showing the circuit configuration of a DC power supply charge/discharge apparatus as a DC/DC converter according to embodiment 5 of the present invention. As shown in FIG. 19, the DC power supply charge/discharge apparatus performs power transmission by bidirectional power conversion between the DC power supply 1 as the first DC power supply and a second DC power supply 2a, and includes the DC/DC converter circuit 100 as a main circuit, and a control circuit 15a. The configuration of the DC/DC converter circuit 100 is the same as in embodiment 1.

In addition, between the second smoothing capacitor 11 and the second DC power supply 2a, the current sensor 14 for detecting charge current i (an arrow indicates the positive direction) for the second DC power supply 2a is provided, and voltage sensors 16 and 17 for respectively detecting voltages V1 and V2 of the first and second smoothing capacitors 3 and 11 are provided. The sensed outputs of the sensors 14, 16, and 17 are inputted to the control circuit 15a. Based on the inputted current i and voltages V1 and V2, the control circuit 15a generates drive signals G-5 and G-12 for performing switching control of the semiconductor switching devices 5a to 5d and 12a to 12d of the first and second switching circuits 4 and 10, thereby performing drive control of the first and second switching circuits 4 and 10.

It is noted that voltage of the first smoothing capacitor 3 is equal to voltage of the DC power supply 1, and voltage of the second smoothing capacitor 11 is equal to voltage of the second DC power supply 2a.

Figure 20:
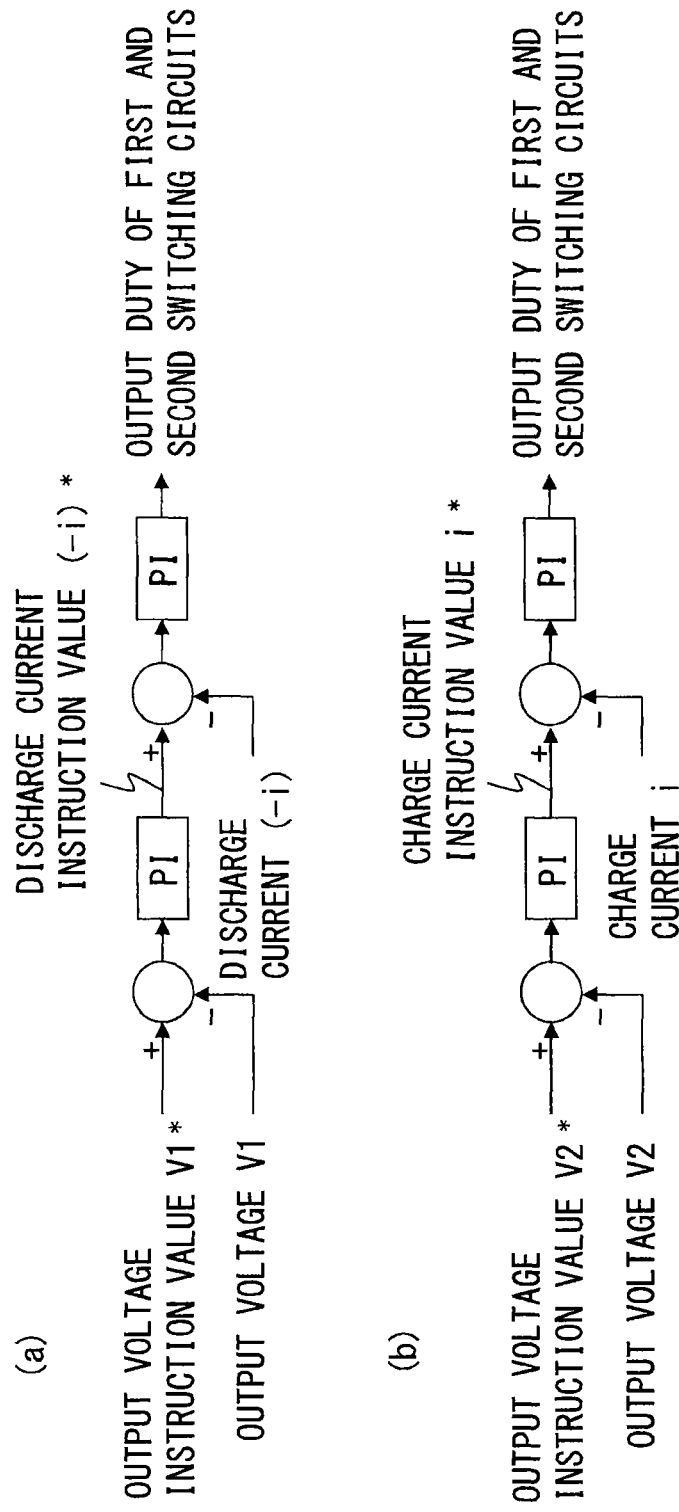
FIG. 20 is a control block diagram of the DC power supply charge/discharge apparatus according to embodiment 5 of the present invention.

FIG. 20 is a control block diagram of the DC power supply charge/discharge apparatus. Specifically, FIG. 20(a) shows control for transmitting power from the second DC power supply 2a to the DC power supply 1, and FIG. 20(b) shows control for transmitting power from the DC power supply 1 to the second DC power supply 2a.

It is noted that only a feedback control manner is different from that in the above embodiment 1, and the cyclic basic control for the first and second switching circuits 4 and 10 is the same as that in the above embodiment 1 shown in FIGS. 3 to 14.

In the control for transmitting power from the second DC power supply 2a to the DC power supply 1, as shown in FIG. 20(a), using the voltage V1 of the DC power supply 1 as the output voltage, the output voltage V1 is subtracted from an output voltage instruction value V1*. When the resultant difference is positive, a discharge current instruction value (−i)* for the second DC power supply 2a is generated so as to have a positive polarity. The state where the discharge current instruction value is positive indicates the state where the power transmission direction is retained in the direction from the second DC power supply 2a to the DC power supply 1. Then, the first diagonal ON time t1 of the first switching circuit 4 is adjusted so that the discharge current (−i) from the second DC power supply 2a to the DC power supply 1 coincides with the discharge current instruction value (−i)*. At this time, the second diagonal ON time t2 of the second switching circuit 10 is kept at the maximum ON time tmax.

When the difference obtained by subtracting the output voltage V1 from the output voltage instruction value V1* is negative, the discharge current instruction value (−i)* having a negative polarity is generated. The state where the discharge current instruction value is negative indicates the state where the power transmission direction has been switched to be the direction from the DC power supply 1 to the second DC power supply 2a. Then, the second diagonal ON time t2 of the second switching circuit 10 is adjusted so that the discharge current (−i) coincides with the discharge current instruction value (−i)*. At this time, the first diagonal ON time t1 of the first switching circuit 4 is kept at the maximum ON time tmax.

Thus, the control circuit 15a can realize the bidirectional control shown in FIG. 12, based on only charge/discharge current ±i flowing between the DC power supply 1 and the second DC power supply 2a.

Next, in the control for transmitting power from the DC power supply 1 to the second DC power supply 2a, as shown in FIG. 20(b), using the voltage V2 of the second DC power supply 2a as the output voltage, the output voltage V2 is subtracted from an output voltage instruction value V2*. When the resultant difference is positive, a charge current instruction value i* for the second DC power supply 2a is generated so as to have a positive polarity. The state where the charge current instruction value is positive indicates the state where the power transmission direction is retained in the direction from the DC power supply 1 to the second DC power supply 2a. Then, the second diagonal ON time t2 of the second switching circuit 10 is adjusted so that the charge current i to the second DC power supply 2a coincides with the discharge current instruction value i*. At this time, the first diagonal ON time t1 of the first switching circuit 4 is kept at the maximum ON time tmax.

When the difference obtained by subtracting the output voltage V2 from the output voltage instruction value V2* is negative, the charge current instruction value i* having a negative polarity is generated. The state where the charge current instruction value is negative indicates the state where the power transmission direction has been switched to be the direction from the second DC power supply 2a to the DC power supply 1. Then, the first diagonal ON time t1 of the first switching circuit 4 is adjusted so that the charge current i coincides with the charge current instruction value i*. At this time, the second diagonal ON time t2 of the second switching circuit 10 is kept at the maximum ON time tmax.

Thus, the control circuit 15a can realize the bidirectional control shown in FIG. 12, based on only charge/discharge current ±i flowing between the DC power supply 1 and the second DC power supply 2a.

In the present embodiment, in FIG. 12, the control amount in a direction of increasing the amount of power transmission from the DC power supply 1 to the battery 2 is the charge current i.

In the present embodiment, a function of performing voltage control for both the DC power supply 1 and the second DC power supply 2a is provided, and the operation can be continued through consistent control irrespective of the power transmission direction. Further, by switching the polarity of the current instruction value for the charge/discharge current ±i, seamless switching of the power transmission direction can be performed. Thus, even in such a case of sudden change in a load, the operation can be stably continued by an early response.

Embodiment 6

In the above embodiments 1 to 5, the first and second reactors 7 and 9 are individually provided. However, leakage inductance of the high-frequency transformer 8 may serve as at least one of these. Also in this case, the same effect can be obtained. Thus, the number of components can be reduced, and the bidirectional operation can be realized with a simple configuration.

In the above embodiments 1 to 4, the battery 2 is used for one (second DC power supply) of the DC power supplies. However, the present invention is not limited thereto. Both of the first and second DC power supplies may be batteries.

It is noted that, within the scope of the present invention, the above embodiments may be freely combined with each other, or each of the above embodiments may be modified or abbreviated as appropriate.

The invention claimed is:

1. A DC/DC converter for performing bidirectional power transmission between a first DC power supply and a second DC power supply, the DC/DC converter comprising:
a transformer;
a first converter section for converting power between DC and AC, the first converter section having a plurality of semiconductor switching devices and connected between the first DC power supply and a first winding of the transformer;
a second converter section for converting power between DC and AC, the second converter section having a plurality of semiconductor switching devices and connected between the second DC power supply and a second winding of the transformer; and
a control circuit for performing drive control of each semiconductor switching device in the first and second converter sections, thereby controlling the first and second converter sections, wherein
the first and second converter sections have capacitors respectively connected in parallel to the semiconductor switching devices, and first and second reactors connected on AC input/output lines, and
the control circuit,
upon power transmission from the first DC power supply to the second DC power supply, controls each semiconductor switching device in the first converter section so as to perform zero voltage switching by using the first reactor, and when voltage of the second DC power supply is higher than voltage generated on the second winding of the transformer, controls the second converter section so as to perform a step-up operation by using the second reactor, and
upon power transmission from the second DC power supply to the first DC power supply, controls each semiconductor switching device in the second converter section so as to perform zero voltage switching by using the second reactor, and when voltage of the first DC power supply is higher than voltage generated on the first winding of the transformer, controls the first converter section so as to perform a step-up operation by using the first reactor.

2. The DC/DC converter according to claim 1, wherein upon power transmission from the first DC power supply to the second DC power supply, when voltage of the second DC power supply is higher than voltage generated on the second winding of the transformer and the control circuit controls the second converter section so as to perform a step-up operation, the control circuit controls the first converter section so that a time in which voltage is applied to the first winding of the transformer becomes a predetermined maximum time, and
upon power transmission from the second DC power supply to the first DC power supply, when voltage of the first DC power supply is higher than voltage generated on the first winding of the transformer and the control circuit controls the first converter section so as to perform a step-up operation, the control circuit controls the second converter section so that a time in which voltage is applied to the second winding of the transformer becomes a predetermined maximum time.

3. The DC/DC converter according to claim 1, wherein the first and second converter sections are each composed of a full-bridge circuit having two bridge circuits.

4. The DC/DC converter according to claim 3, wherein the control circuit controls the positive-side semiconductor switching device and the negative-side semiconductor switching device of each bridge circuit of the full-bridge circuit composing each of the first and second converter sections, at an ON time ratio of 50%, in the case where a short-circuit prevention time is ignored, and
controls, by drive signals having the same phase, a first reference device which is either the positive-side semiconductor switching device or the negative-side semiconductor switching device of one of the bridge circuits in the first converter section, and a second reference device which is either the positive-side semiconductor switching device or the negative-side semiconductor switching device of one of the bridge circuits in the second converter section.

5. The DC/DC converter according to claim 2, wherein the first and second converter sections are each composed of a full-bridge circuit having two bridge circuits, and
wherein the control circuit
controls the positive-side semiconductor switching device and the negative-side semiconductor switching device of each bridge circuit of the full-bridge circuit composing each of the first and second converter sections, at an ON time ratio of 50%, in the case where a short-circuit prevention time is ignored, and controls, by drive signals having the same phase, a first reference device which is either the positive-side semiconductor switching device or the negative-side semiconductor switching device of one of the bridge circuits in the first converter section, and a second reference device which is either the positive-side semiconductor switching device or the negative-side semiconductor switching device of one of the bridge circuits in the second converter section.

6. The DC/DC converter according to claim 4, wherein the control circuit controls the first and second converters sections so that a first diagonal ON time in which the semiconductor switching device diagonally positioned with respect to the first reference device in the first converter section is ON simultaneously with the first reference device, and a second diagonal ON time in which the semiconductor switching device diagonally positioned with respect to the second reference device in the second converter section is ON simultaneously with the second reference device, in the case where a point at which both the first diagonal ON time and the second diagonal ON time become a set maximum ON time is defined as a reference point, when a control amount of power transmission from the first DC power supply to the second DC power supply is to be increased with respect to the reference point the first diagonal ON time is retained at the maximum ON time and the second diagonal ON time is decreased, and when a control amount of power transmission from the first DC power supply to the second DC power supply is to be decreased with respect to the reference point, the second diagonal ON time is retained at the maximum ON time and the first diagonal ON time is decreased, thereby performing bidirectional power transmission between the first DC power supply and the second DC power supply.

7. The DC/DC converter according to claim 5, wherein the control circuit controls the first and second converter sections so that a first diagonal ON time in which the semiconductor switching device diagonally positioned with respect to the first reference device in the first converter section is ON simultaneously with the first reference device, and a second diagonal ON time in which the semiconductor switching device diagonally positioned with respect to the second reference device in the second converter section is ON simultaneously with the second reference device, in the case where a point at which both the first diagonal ON time and the second diagonal ON time become a set maximum ON time is defined as a reference point, when a control amount of power transmission from the first DC power supply to the second DC power supply is to be increased with respect to the reference point, the first diagonal ON time is retained at the maximum ON time and the second diagonal ON time is decreased, and when a control amount of power transmission from the first DC power supply to the second DC power supply is to be decreased with respect to the reference point, the second diagonal ON time is retained at the maximum ON time and the first diagonal ON time is decreased, thereby performing bidirectional power transmission between the first DC power supply and the second DC power supply.

8. The DC/DC converter according to claim 6, wherein the maximum ON time is set based on a time for each semiconductor switching device in the first and second converter sections to perform the zero voltage switching.

9. The DC/DC converter according to claim 6, wherein the control circuit feeds back a difference obtained by subtracting voltage of the first DC power supply or the second DC power supply from a voltage instruction value, thereby generating a current instruction value for current flowing between the first and second DC power supplies, and in accordance with a polarity of the current instruction value, switches a power transmission direction between the first and second DC power supplies, and adjusts the first diagonal ON time of the first converter section or the second diagonal ON time of the second converter section.

10. The DC/DC converter according to claim 9, wherein upon power transmission from the first DC power supply to the second DC power supply, when a polarity of a first difference obtained by subtracting voltage of the second DC power supply from a voltage instruction value is positive, the control circuit retains a power transmission direction toward the second DC power supply and adjusts the second diagonal ON time of the second converter section, and when the first difference has become negative, the control circuit switches the power transmission direction to a power transmission direction toward the first DC power supply and adjusts the first diagonal ON time of the first converter section, and upon power transmission from the second DC power supply to the first DC power supply, when a polarity of a second difference obtained by subtracting voltage of the first DC power supply from a voltage instruction value is positive, the control circuit retains a power transmission direction toward the first DC power supply and adjusts the first diagonal ON time of the first converter section, and when the second difference has become negative, the control circuit switches the power transmission direction to a power transmission direction toward the second DC power supply and adjusts the second diagonal ON time of the second converter section.

11. The DC/DC converter according to claim 1, wherein one or both of the first and second reactors are formed by leakage inductance of the transformer.

12. The DC/DC converter according to claim 1, wherein one or both of the first and second DC power supplies are formed by batteries, and charge and discharge of the batteries are performed by bidirectional power transmission between the first DC power supply and the second DC power supply.

13. The DC/DC converter according to claim 7, wherein the maximum ON time is set based on a time for each semiconductor switching device in the first and second converter sections to perform the zero voltage switching.

14. The DC/DC converter according to claim 7, wherein the control circuit feeds back a difference obtained by subtracting voltage of the first DC power supply or the second DC power supply from a voltage instruction value, thereby generating a current instruction value for current flowing between the first and second DC power supplies, and in accordance with a polarity of the current instruction value, switches a power transmission direction between the first and second DC power supplies, and adjusts the first diagonal ON time of the first converter section or the second diagonal ON time of the second converter section.

15. The DC/DC converter according to claim 14, wherein upon power transmission from the first DC power supply to the second DC power supply, when a polarity of a first difference obtained by subtracting voltage of the second DC power supply from a voltage instruction value is positive, the control circuit retains a power transmission direction toward the second DC power supply and adjusts the second diagonal ON time of the second converter section, and when the first difference has become negative, the control circuit switches the power transmission direction to a power transmission direction toward the first DC power supply and adjusts the first diagonal ON time of the first converter section, and upon power transmission from the second DC power supply to the first DC power supply, when a polarity of a second difference obtained by subtracting voltage of the first DC power supply from a voltage instruction value is positive, the control circuit retains a power transmission direction toward the first DC power supply and adjusts the first diagonal ON time of the first converter section, and when the second difference has become negative, the control circuit switches the power transmission direction to a power transmission direction toward the second DC power supply and adjusts the second diagonal ON time of the second converter section.

* * * * *